(12) United States Patent
de Pablo et al.

(10) Patent No.: US 11,921,393 B2
(45) Date of Patent: *Mar. 5, 2024

(54) BLUE PHASES ON PATTERNED SURFACES

(71) Applicant: The University of Chicago, Chicago, IL (US)

(72) Inventors: Juan Jose de Pablo, Chicago, IL (US); Paul Franklin Nealey, Chicago, IL (US); Xiao Li, Chicago, IL (US); Jose A. Martinez-Gonzalez, Chicago, IL (US); Monirosadat Sadati, Chicago, IL (US); Rui Zhang, Chicago, IL (US); Ye Zhou, Chicago, IL (US)

(73) Assignee: The University of Chicago, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/249,646

(22) Filed: Mar. 8, 2021

(65) Prior Publication Data

US 2021/0263357 A1 Aug. 26, 2021

Related U.S. Application Data

(62) Division of application No. 16/048,891, filed on Jul. 30, 2018, now Pat. No. 10,969,642.

(60) Provisional application No. 62/538,760, filed on Jul. 30, 2017.

(51) Int. Cl.
| | |
|---|---|
| *G02F 1/139* | (2006.01) |
| *C09K 19/00* | (2006.01) |
| *G02F 1/1333* | (2006.01) |
| *G02F 1/137* | (2006.01) |

(52) U.S. Cl.
CPC ............ *G02F 1/1393* (2013.01); *G02F 1/137* (2013.01); *G02F 1/1396* (2013.01); *C09K 19/00* (2013.01); *G02F 1/1333* (2013.01); *G02F 1/13793* (2021.01); *G02F 2201/00* (2013.01)

(58) Field of Classification Search
CPC .................... G02F 2001/13793; G02F 1/1393
See application file for complete search history.

(56) References Cited

U.S. PATENT DOCUMENTS

| | | | | |
|---|---|---|---|---|
| 10,969,642 | B2* | 4/2021 | de Pablo | G02F 1/1396 |
| 2012/0262662 | A1* | 10/2012 | Chien | C09K 19/0275 |
| | | | | 977/762 |
| 2013/0242233 | A1* | 9/2013 | Kubota | G02F 1/137 |
| | | | | 349/73 |
| 2014/0063423 | A1* | 3/2014 | Chen | G02F 1/133512 |
| | | | | 349/110 |

(Continued)

OTHER PUBLICATIONS

U.S. Office Action dated Feb. 5, 2020, issued in U.S. Appl. No. 16/048,891.

(Continued)

*Primary Examiner* — Jonathan Y Jung
(74) *Attorney, Agent, or Firm* — Weaver Austin Villeneuve & Sampson LLP

(57) ABSTRACT

Stable, macroscopic single-crystal chiral liquid crystal compositions are described. The compositions include a single-crystal chiral liquid crystal material on a patterned surface. The patterned surface seeds a particular crystallographic orientation at the substrate-liquid crystal interface. Also described are methods of forming the single-crystal chiral liquid crystal compositions.

19 Claims, 15 Drawing Sheets

(56) References Cited

U.S. PATENT DOCUMENTS

| | | |
|---|---|---|
| 2016/0085095 A1 | 3/2016 | Chien et al. |
| 2016/0178588 A1* | 6/2016 | Abbott .............. G02F 1/133377 349/193 |
| 2019/0049767 A1 | 2/2019 | de Pablo et al. |
| 2019/0250438 A1* | 8/2019 | Oton ................. C09K 19/0275 |

OTHER PUBLICATIONS

U.S. Final Office Action dated Aug. 11, 2020, issued in U.S. Appl. No. 16/048,891.

U.S. Notice of Allowance dated Nov. 25, 2020, issued in U.S. Appl. No. 16/048,891.

Castles, et al., "Blue-phase templated fabrication of three-dimensional nanostructures for photonic applications," Nature Material, Letter published online, vol. 11, May 13, 2012, DOI: 10.1038/NMAT3330, pp. 599-603.

Abstract and Presentation Slides: APS Mar. Meeting 2017, Mar. 13-17, 2017; 21 pages.

Li, et al., "Directed self-assembly of nematic liquid crystals on chemically patterned surfaces: morphological states and transitions," The Royal Society of Chemistry, Soft Matter, 2016, vol. 12, pp. 8595-8605.

Nayek, et al., Tailoring Monodomain in Blue Phase Liquid Crystal by Surface Pinning Effect, Applied Physics Express, The Japan Society of Applied Physics, vol. 5, 2012, pp. 051701-1-051701-3.

Martinez-Gonzalez, et al., "Directed self-assembly of liquid crystalline blue-phases into ideal single-crystals," Nature Communications, 8:15854, DOI: 10.1038/ncomms15854, published Jun 16, 2017, 20 pages.

Martinez-Gonzalez, et al., "Blue-phase liquid crystal droplets," PNAS, Oct. 27, 2015, vol. 12, No. 43, pp. 13195-13200.

Rahman, et al., "Blue phase liquid crystal: strategies for phase stabilization and device development," National Institute for Materials Science, Sci. Technol. Adv. Mater., vol. 16, 2015, 22 pages.

Rincon-Delgadillo, et al., "Scale-up of a Chemo-Epitaxy Flow for Feature Multiplication Using Directed Self-Assembly of Block-Copolymers," Journal of Photopolymer Science and Technology, vol. 26, No. 6, 2013, pp. 831-839.

Stratford, et al., "Self-assembly of colloid-cholesteric composites provides a possible route to switchable optical materials," Nature Communications, DOI: 10.1038/ncomms4954, published Jun. 18, 2014, 8 pages.

Martinez-Gonzalez, et al "Blue-Phase Liquid Crystals Under Controlled Confinement: The Effect of Patterned Surfaces," University of Chicago, the Institute for Molecular Engineering, 26th International Liquid Crystal Conference, Jul. 31-Aug. 5, 2016, Kent, USA (Poster Presentation), 1 page.

* cited by examiner

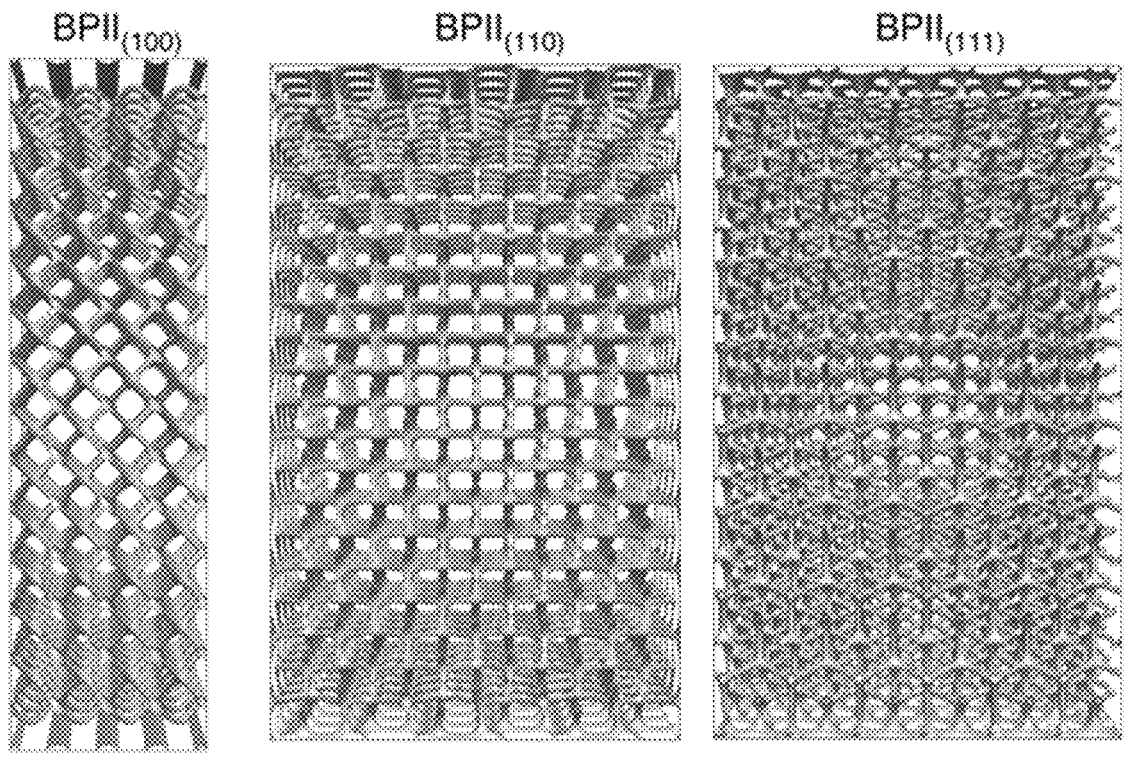
FIG. 1A
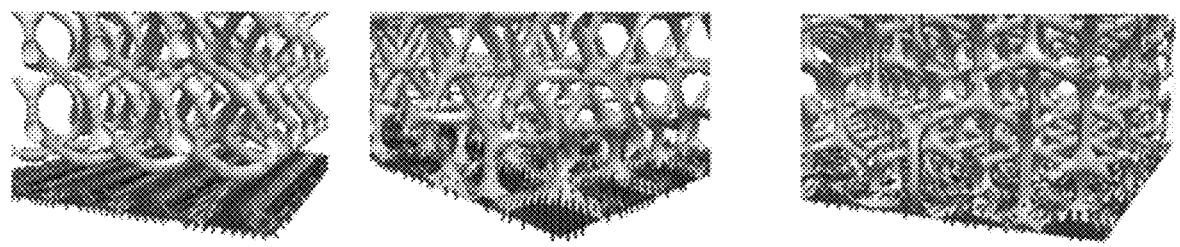
FIG. 1B
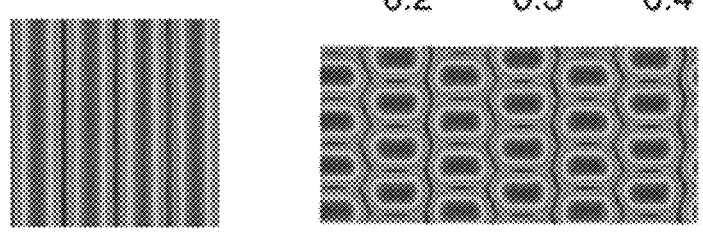 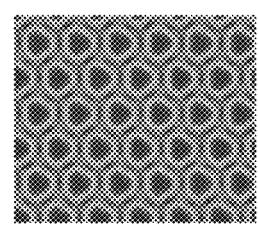
FIG. 1C

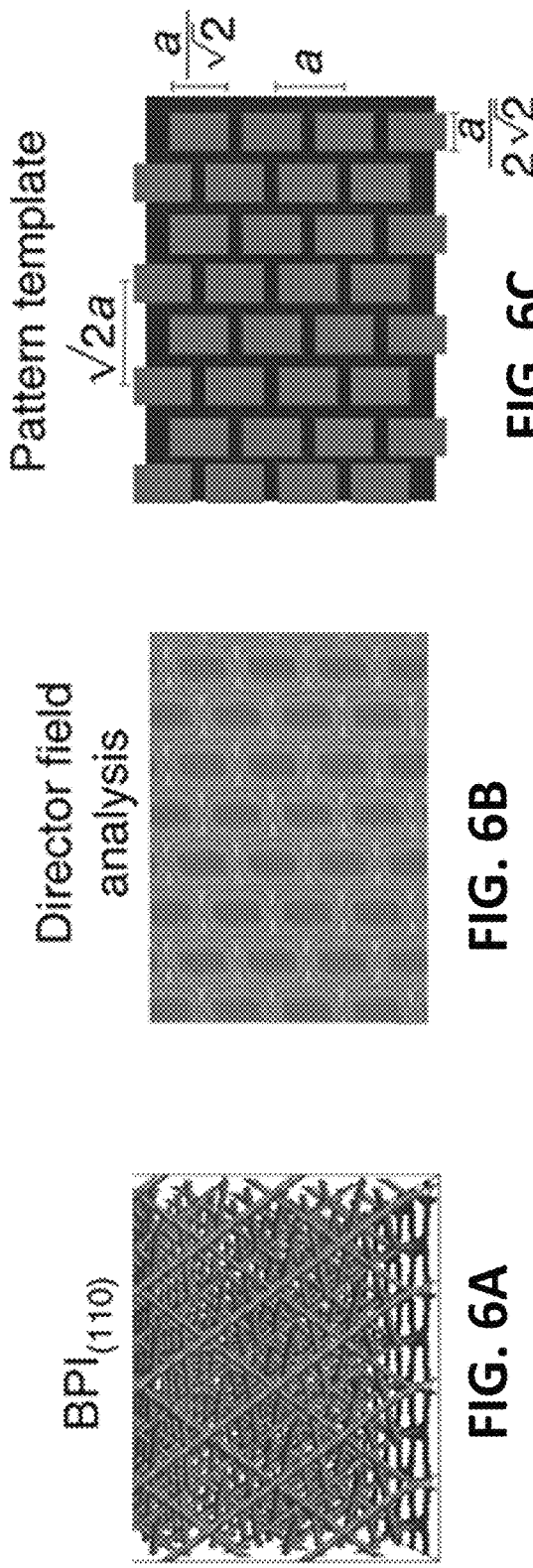
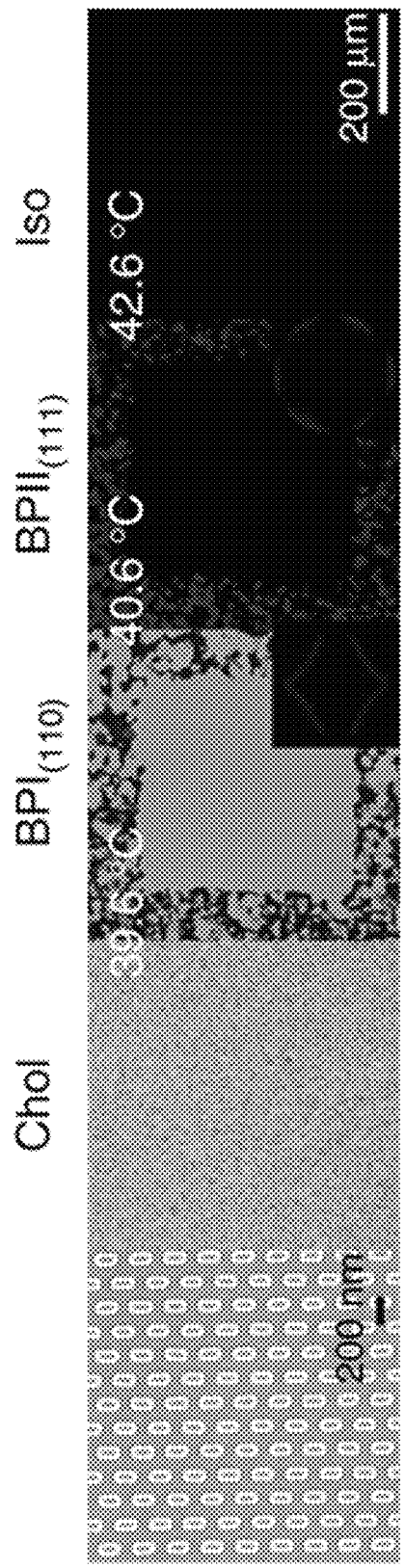
FIG. 6A BPI$_{(110)}$
FIG. 6B Director field analysis
FIG. 6C Pattern template
FIG. 6D Experiments on chemically-patterned surfaces
Chol | BPI$_{(110)}$ | BPII$_{(111)}$ | Iso

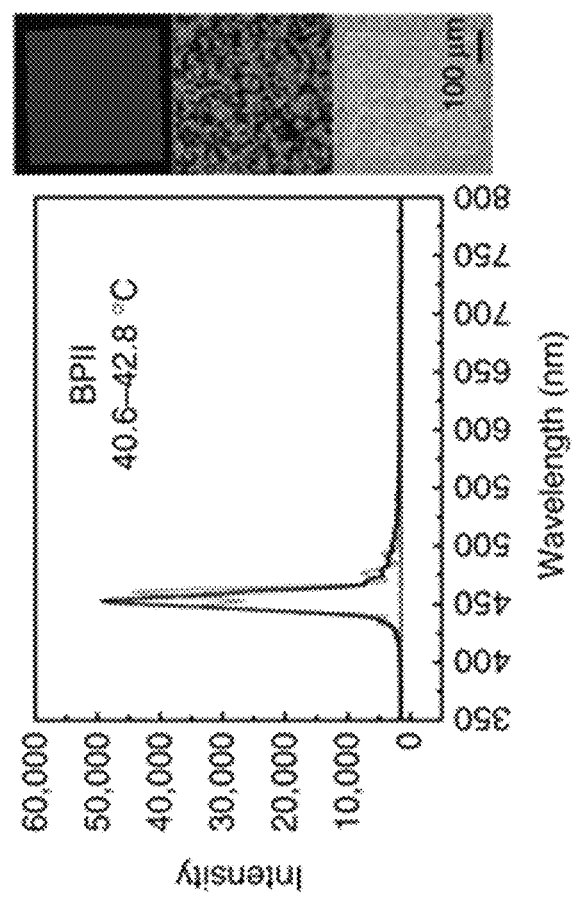
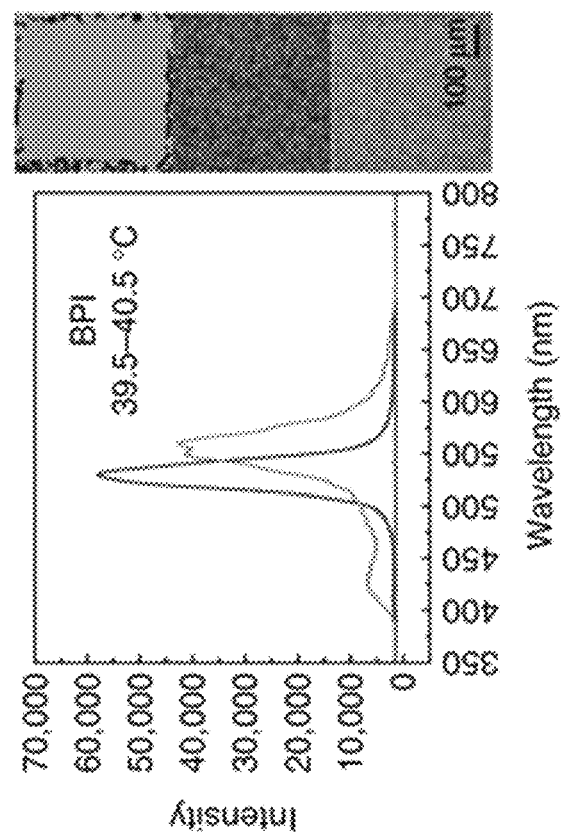
FIG. 7

BLUE PHASES ON PATTERNED SURFACES

STATEMENT OF GOVERNMENTAL SUPPORT

This invention was made with government support under grant number DMR1420709 awarded by the National Science Foundation, and grant number DE-AC02-06CH11357 awarded by the Department of Energy. The government has certain rights in the invention.

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in their entireties and for all purposes.

BACKGROUND

Blue phases (BP's) represent chiral liquid-crystalline states where molecules spontaneously form structures of double-twisted cylinders. Such cylinders then adopt crystalline arrangements that are ultimately responsible for the materials' colors. Blue phases appear in a narrow range of temperature, between the isotropic (I) and cholesteric (Chol) states. In the so-called blue phase I (BPI) and blue phase II (BPII), the double-twisted cylinders are arranged in a cubic crystalline structure with a body center cubic (BCC) or a simple cubic (SC) symmetry, respectively. Such structures are accompanied by the formation of ordered networks of topological defects that reflect light in the visible range. A third blue phase, the so-called blue phase III (BPIII), exhibits a disordered structure. The highly ordered morphologies of BPI and BPII gives rise to unusual physical properties, including a high viscosity, Bragg reflection of visible light, a finite shear modulus, and a fast optical response—much faster than that of traditional nematic liquid crystals. These properties are desirable for a range of technologies including those involving photonic materials, electro-optical devices, and biological sensors. However, applications of BPs to date have been limited because blue-phase specimens are generally polycrystalline and have many small multi-platelet domains, each one reflecting light according to its orientation, which affects the intensity of the Bragg reflections and the operating voltage. Blue phase monodomain specimens are polycrystalline specimens where small crystalline platelets (e.g., about 10 µm) have the same lattice plane parallel to the substrate. They can be produced using electric, thermal or surface treatments. However, the grain boundaries between platelets interfere with performance. It has not been possible to create macroscopic specimens of single-crystal blue phases with a specific crystallographic plane orientation.

SUMMARY

One aspect of the disclosed subject matter relates to a composition including a surface having a surface pattern that extends over a first area and a monocrystalline liquid crystalline material that extends over the first area. In some embodiments, the monocrystalline material is a blue phase liquid crystal. In some such embodiments, the blue phase liquid crystal is a blue phase I (BPI) liquid crystal and in some such embodiments, the blue phase liquid crystal is a blue phase II (BPII) liquid crystal. In some embodiments, the monocrystalline material is a cholesteric liquid crystal.

The surface pattern may take various forms. For example, in some embodiments, the surface pattern is a stripe pattern and in some embodiments, the surface pattern is a hexagonal array. A hexagonal array may be, for example, a hexagonal array of circles, a hexagonal array of rectangles, or a hexagonal array of other features. In some embodiments, the surface pattern is a pattern of regions of different interfacial energy between the surface and the monocrystalline material. In some embodiments, the surface pattern is a pattern of regions of different interfacial orientation between the substrate surface and the monocrystalline material. In some embodiments, the surface pattern includes alternating stripes of regions of different chemical functionality. In some embodiments, the surface pattern includes an array of features of a first chemical functionality against a field of a second chemical functionality. In some embodiments, the surface pattern relieves elastic distortions that would be induced by a homogenous surface.

In some embodiments, the surface pattern is a periodic pattern characterized by a pattern period Ls. For example, in some embodiments, the surface pattern is a pattern of stripes, the pattern period Ls is the width of two adjacent stripes, and the pattern period Ls is equal to the lattice constant of a unit cell of the monocrystalline liquid crystalline material. In another example, in some embodiments, the surface pattern is a pattern of stripes, the pattern period Ls is the width of two adjacent stripes, and the pattern period Ls is equal to the lattice constant of a unit cell of the monocrystalline liquid crystalline material. In another example, in some embodiments, the surface pattern is a hexagonal array of features, the pattern period Ls is the center-to-center distance of adjacent features, and the pattern period Ls is equal to the square root of two times the lattice constant of a unit cell of the monocrystalline liquid crystalline material.

In some embodiments, the surface is patterned with regions that induce planar orientation of molecules in the monocrystalline liquid crystalline material and regions that induce homeotropic orientation of molecules in the monocrystalline liquid crystalline material. In some embodiments, the surface is patterned with regions that induce a tilted orientation of molecules in the monocrystalline liquid crystalline material.

The first area may be large in some embodiments. For example, according to various embodiments, the first area is at least 100 µm$^2$, at least 500 µm$^2$, at least 1 mm$^2$, at least 1 cm$^2$, at least 10 cm$^2$, or at least 1 m$^2$. In some embodiments, the monocrystalline material is at least 20 µm thick or at least 30 µm thick.

In some embodiments, the surface includes polymer brushes. In some embodiments, the surface includes a self-assembled monolayer. In some embodiments, the surface pattern includes topographical features.

In some embodiments, the surface pattern includes chemical and topographical features In some embodiments, the monocrystalline liquid crystalline material is switchable on application of an external field.

Another aspect of the disclosure is an electro-optical device including a composition that includes a surface having a surface pattern that extends over a first area and a monocrystalline liquid crystalline material that extends over the first area. Another aspect of the disclosure is a photonic material including a composition that includes a surface having a surface pattern that extends over a first area and a monocrystalline liquid crystalline material that extends over the first area. Another aspect of the disclosure is a liquid crystal display including a composition that includes a surface having a surface pattern that extends over a first area and a monocrystalline liquid crystalline material that extends over the first area.

Another aspect of the disclosure is a liquid crystal cell including a first substrate having a first substrate surface having a first surface pattern; a second substrate having a second substrate surface; and a liquid crystalline material disposed between the first and second substrate surfaces, characterized in the liquid crystalline material has no grain boundaries where it overlies the first surface pattern. In some embodiments, the second substrate surface is homogenous. In some embodiments, the second substrate surface has a second surface pattern. In some such embodiments, the second surface pattern is co-extensive with the first surface pattern. In some embodiments, the first surface pattern is co-extensive with the first surface.

In some embodiments, the liquid crystal cell further includes electrodes on the first substrate and the second substrate. In some embodiments, the liquid crystalline material is a blue phase liquid crystal. In some such embodiments, the blue phase liquid crystal is a blue phase I (BPI) liquid crystal. In some such embodiments, the blue phase liquid crystal is a blue phase II (BPII) liquid crystal. In some embodiments, the liquid crystalline material is a cholesteric liquid crystal.

The surface pattern may take various forms. For example, in some embodiments, the first surface pattern is a stripe pattern. In some embodiments, the first surface pattern is a hexagonal array. In some embodiments, the first surface pattern is a pattern of regions of different interfacial energy between the surface and the liquid crystalline material. In some embodiments, the first surface pattern is a pattern of regions of different interfacial orientation between the substrate surface and the liquid crystalline material. In some embodiments, the first surface pattern relieves elastic distortions that would be induced by a homogenous surface.

The first area may be large in some embodiments. For example, according to various embodiments, the first area is at least 100 $\mu m^2$, at least 500 $\mu m^2$, at least 1 $mm^2$, at least 1 $cm^2$, at least 10 $cm^2$, or at least 1 $m^2$. In some embodiments, the monocrystalline material is at least 20 μm thick.

In some embodiments, the first surface includes patterned polymer brushes. In some embodiments, the first surface includes a patterned self-assembled monolayer. In some embodiments, the first surface pattern includes topographical features. In some embodiments, the first surface pattern includes chemical and topographical features.

In some embodiments, the first surface includes the first surface pattern includes alternating stripes of regions of different chemical functionality. In some embodiments, the first surface pattern is a periodic pattern characterized by a pattern period Ls. In some embodiments, the first surface pattern is a pattern of stripes, the pattern period Ls is the width of two adjacent stripes, and the pattern period Ls is equal to the lattice constant of a unit cell of the liquid crystalline material. In some embodiments, the first surface pattern is a pattern of stripes, the pattern period Ls is the width of two adjacent stripes, and the pattern period Ls is equal to the lattice constant of a unit cell of the liquid crystalline material. In some embodiments, the first surface pattern is a hexagonal array of features, the pattern period Ls is the center-to-center distance of adjacent features, and the pattern period Ls is equal to the square root of two times the lattice constant of a unit cell of the liquid crystalline material. In some embodiments, the first surface pattern is patterned with regions that induce planar orientation of molecules in the liquid crystalline material and regions that induce homeotropic orientation of molecules in the liquid crystalline material. In some embodiments, the first surface pattern is patterned with regions that induce a tilted orientation of molecules in the liquid crystalline material. In some embodiments, the liquid crystalline material is switchable on application of an external field.

Another aspect of the disclosure relates to a method including: providing a first substrate having a surface pattern that extends over a first area; providing a second substrate; injecting or otherwise disposing a liquid crystal mixture between the first substrate and the second substrate such that the liquid crystal mixture contacts the surface pattern; and allowing the surface pattern to direct the self-assembly of the liquid crystal material to form a monocrystalline liquid crystal over the surface pattern. In some embodiments, the method further includes polymerizing material in defect regions of the monocrystalline material. In some embodiments, the method further includes washing the liquid crystal to leave polymerized material. In some embodiments, the method further includes allowing the surface pattern to direct the self-assembly of the liquid crystal material to form a monocrystalline liquid crystal over the surface pattern includes heating the liquid crystal mixture. In some embodiments, the liquid crystal mixture includes liquid crystal molecules and a chiral dopant. In some embodiments, the liquid crystal mixture is capable of forming a blue phase liquid crystal. Another aspect of the disclosure is a freestanding three-dimensional nanostructure fabricated by the methods described above.

These and other aspects of the disclosure are described further below with reference to the Figures.

BRIEF DESCRIPTION OF DRAWINGS

FIG. 1(a) shows the defect structures of different orientations of a blue phase II (BPII) state with.

FIG. 1(b) is a close up of the BPII-topological line defects and molecular orientation at the proximity of uniform homeotropic interfaces.

FIG. 1(c) shows scalar order parameter maps at the corresponding interfaces in FIG. 1(b).

FIG. 2(a) shows a stripe-like pattern and FIGS. 2(b) and 2(c) show hexagonal arrays of rectangles and circles, respectively.

FIG. 5(b) shows the single crystalline domain on stripe patterned surface;

FIG. 5(c) shows the monodomain adjacent to the stripe pattern area.

FIGS. 6(a)-(d) summarize a process for obtaining a single-crystal of the $BPI_{(110)}$, where the blue-phase lattice parameter is $a_{BPI}$=260 nm.

FIG. 7 shows the reflection spectrum of the Chol phase, and that of the polycrystalline and single-crystal domains of BPI and BPII, respectively.

DETAILED DESCRIPTION

Figures 2A, 2B, 2C:
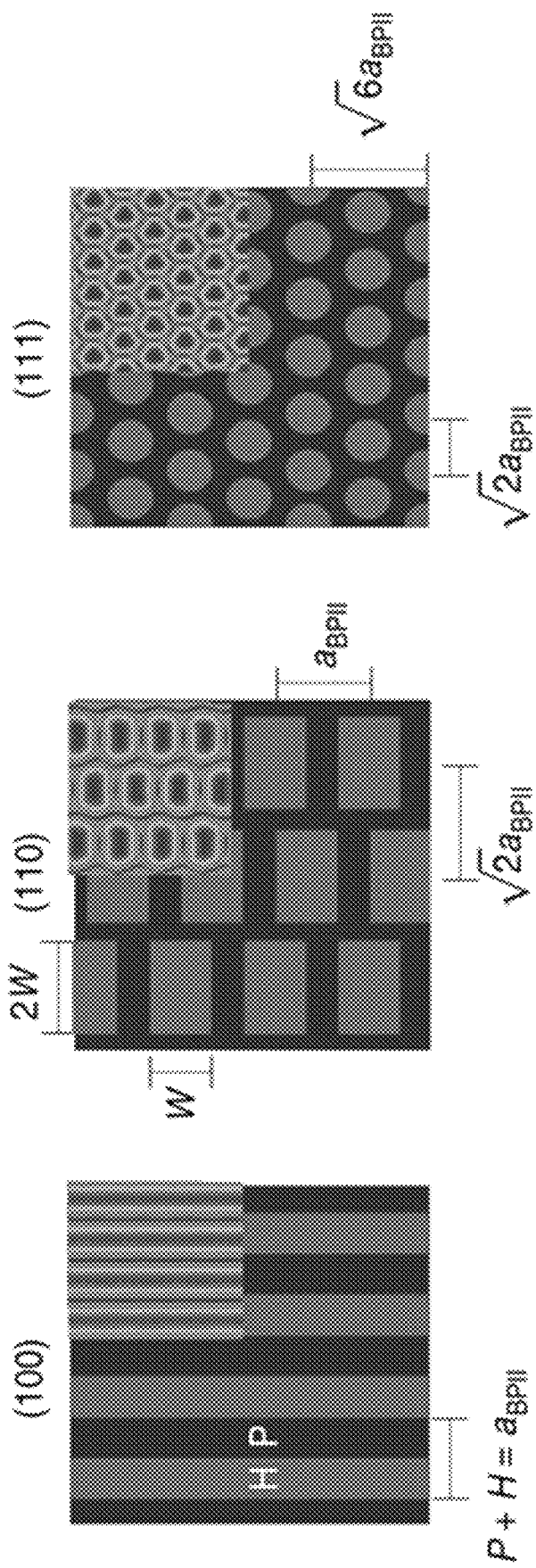
FIGS. 2(a)-(c) show particular designs to direct the BPII orientation along specific Miller indices given the information from the numerical simulations in FIGS. 1(a)-(b)

Stable, macroscopic single-crystal chiral liquid crystal compositions are described. The compositions include a single-crystal chiral liquid crystalline material on a patterned surface. The patterned surface seeds a particular crystallographic orientation at the substrate-liquid crystal interface. Also described are methods of forming the single-crystal chiral liquid crystal compositions.

Directed self-assembly involves the use of a surface pattern to direct the assembly of the chiral liquid crystal material into a specific orientation. It may be used over arbitrarily large, macroscopic areas. In the below description, examples of directed self-assembly of liquid crystalline materials into single-crystals are provided. While the examples focus on liquid crystalline blue phases, the methods and compositions may be applied to any other phases that exhibit chirality including cholesteric phases. Further description of the liquid crystal materials, patterns, and related fabrication methods is provided below.

I. Patterns

The lattice orientation of a liquid-crystal phase can be mediated by the strain induced by any confining geometry and the corresponding anchoring conditions; parallel anchoring (also called planar anchoring) at a surface or interface induces molecules to lay down on that surface, and homeotropic anchoring causes them to adopt a perpendicular orientation with respect to the surface.

Various embodiments of the compositions described herein include liquid crystal materials that are directed to assemble by a surface pattern. The surface patterns include regions of different interfacial energy and/or differing interfacial orientation with respect to the liquid crystal material. As an example, a stripe pattern of alternating planar anchoring and homeotropic regions can be used to form (100) lattice orientation of BPII ($BPII_{(100)}$). The patterns are not limited to homeotropic (90°) and planar (0°) anchoring, but may include any pattern of contrast in interfacial energy and/or orientation, including any tilted orientations. For example, pattern may include regions that induce a 4° tilted orientation and 75° tilted orientation.

A pattern configured to induce a particular orientation in the liquid crystal phase may be determined by any appropriate method. In some embodiments, a pattern is configured to relieve elastic distortions induced by the surface. In some embodiments, surface order maps (S-maps) that provide an indication of the local strain (and therefore energetic cost) associated with presenting a particular crystallographic plane onto a surface may be used as a blueprint for designing a pattern to relieve the elastic distortions induced by the surface. Examples of using surface order maps to design patterns to induce particular crystallographic orientations in blue phases are described below. In addition to alternating stripes, examples of patterns include hexagonal arrays of circles, and hexagonal arrays of rectangles. The patterns may be chemical, topographical, or chemical and topographical.

The surface pattern may be designed such that it is energetically favorable to be single crystals. As discussed below, there is a processing window or tolerance for patterns to induce single crystal formation.

According to various embodiments, the pattern is a periodic pattern and may be characterized by a characteristic length "L," which is used herein to denote a characteristic length or spacing in a pattern. It may be referred to as a lattice constant, pitch, period or length. Periodic patterns formed on substrate. For example, a period L of a stripe pattern may be the width of two stripes. $L_s$ is used herein to denote the period, pitch, lattice constant or other characteristic length of a substrate pattern. For a hexagonal array, the periodicity can be characterized by the distance between the circles or squares of the array. In some embodiments, $L_s$ is correlated to the lattice constant of the unit cell as shown in FIG. 2, discussed below.

A pattern may be characterized by its features (e.g., stripes, arrayed circles, arrayed rectangles, etc.), the density of its features, and the total area over which the pattern extends. As indicated above, a pattern may extend over an arbitrarily large area. The area can depend on the particular application, with example dimensions being on the order of microns, centimeters, or meters.

Dimensions of the patterned regions or features depend on the particular liquid crystal material, but generally around 50 nm to a few hundred nanometers. Accordingly, any patterning method that has a resolution of 50 nm or 100 nm may be used. This includes optical lithography, nano-imprint lithography, roll-to-roll imprint lithography, and e-beam lithography.

Although it may be convenient depending on the patterning technique to create a periodic substrate pattern, a periodic pattern is not necessarily required as long as the pattern features of the substrate pattern correspond to a subset of the pattern features of a periodic pattern that can be used to direct the self-assembly of a single crystal. In general, this can be thought of as removing some percentage of the features of the desired pattern, with the spacing of the remaining features left intact.

Any material that can be modified to tune its interfacial energy and/or interfacial orientation with respect to the liquid crystal material may be patterned. These include polymer brushes and self-assembled monolayers, which may be patterned. A technique to pattern polymer brushes is described in Li, X. et al. *Directed self-assembly of nematic* liquid crystals on chemically patterned surfaces: morphological states and transitions. Soft Matter 12, 8595-8605 (2016), incorporated by reference herein.

In some embodiments, a substrate may be patterned by physical alterations such as scratching or rubbing. For example, an atomic force microscope may be used to scratch a surface. Photosensitive polymers that can direct liquid crystal alignment may be used. Such polymers are described in Mahilny et al., *Photosensitive Polymers for Liquid Crystal Alignment*, Physics Procedia, Volume 73, p. 121-125 (2015), incorporated by reference herein. An example of a polymer brush pattern is provided below.

Examples of self-assembled monolayers include self-assembled monolayers of silane or siloxane compounds, such as self-assembled monolayer of octadecyltrichlorosilane. See Kim et al. *Chemical Modification of Self-Assembled Monolayers by Exposure to Soft X-rays in Air*, Journal of Physical Chemistry B, 2000, 104, 7403-7410, incorporated by reference herein.

Liquid crystal cells provided herein include self-assembled liquid crystal structures between two parallel substrates, one of which is patterned as described above. The other substrate may be configured to induce a particular homogenous orientation (e.g., homeotropic). In some embodiments, both parallel substrates are also patterned.

The bulk substrate material may be any appropriate material including semiconductor materials (e.g., a silicon (Si) or gallium arsenide (GaAs) substrate, glass, and plastic). The substrates may be the same or a different material. In some embodiments, one or both of the substrates may be in the form of a web suitable for roll-to-roll processing. In some embodiments, the substrates may include electrodes.

II. Self-Assembled Liquid Crystals

The self-assembled liquid crystal compositions may be characterized as monocrystalline domains that extend over an arbitrarily large area and have a specified orientation with respect to the underlying surface.

The term monocrystalline may be used interchangeably with single-crystal and refers to a material in which the crystal lattice is continuous and unbroken with no grain boundaries to the edge of the sample. As used herein, the sample refers to liquid crystal that is formed over or overlies a patterned area of the surface. In some embodiments, an entire surface of a substrate may be patterned, with the sample co-extensive with that surface. In some embodiments, only a portion of a surface may be patterned, with the sample co-extensive with that portion.

The liquid crystal materials are chiral liquid crystals. These include cholesteric liquid crystals (also referred to as chiral nematic liquid crystals) and blue phase liquid crystals.

In some embodiments, blue phase liquid crystals are provided. Blue phases (BP's) represent chiral liquid-crystalline states where molecules spontaneously form structures of double-twisted cylinders. Such cylinders then adopt crystalline arrangements that are ultimately responsible for the materials' colors.

Blue phase materials are materials that are capable of forming blue phases and may include nematic liquid crystal molecules and chiral dopants. In some embodiments, the blue phase materials may include other materials such as polymers and nanoparticles. See, e.g., Rahman et al., *Blue phase liquid crystal: strategies for phase stabilization and device development*, Sci. Technol. Adv. Mater. 16 (2015) 033501, which is incorporated by reference for the purpose of describing blue phase materials. Examples of nematic liquid crystals include: 4-Cyano-4'-pentylbiphenyl (5CB), MLC2142, JC-BP06N, and MLC6248. Examples of chiral dopants include CB15, ISO-(6OBA)2, and R5011.

According to various embodiments, the blue phase I (BPI) or blue phase (II) liquid crystals are provided. In the blue phase I (BPI) and the blue phase II (BPII), the double-twisted cylinders are arranged in a cubic crystalline structure with a body center cubic (BCC) or a simple cubic (SC) symmetry, respectively. The structures are accompanied by the formation of ordered networks of topological defects that reflect light in the visible range.

As indicated above, the liquid crystals have a particular orientation to the underlying surface. In some embodiments, the orientation is be characterized as the crystallographic plane (hkl) parallel to the surface, where h, k and l are the Miller indices. For example, $BPII_{(100)}$ indicates the 100 plane of the BPII unit cell.

The liquid crystal materials may be of any appropriate thickness; films of 20 microns and 30 microns thick have been produced, with organization propagated throughout the thickness of the film. It is expected that thicker layers may be produced.

III. Designing Pattern Templates

According to various embodiments, a pattern template may be designed using the following method. First, binary patterns are designed from continuum simulations of a $BPII_{(hkl)}$ under uniform interfacial conditions. The S-maps at the interface are correlated with the preferred molecular alignment: BP molecules in regions with the highest order parameter show a preferred alignment (e.g., perpendicular) at the interface. In the other regions, the preferred molecular alignment deviates slightly from that imposed by the interface and is associated with a preference for another alignment (e.g., planar). This may be indicated by the behavior of the director field above the interface. The S-maps are simplified into a binary pattern (e.g., consisting of planar and homeotropic regions); the symmetry of the patterns is described in terms of the BP lattice constant. The optimal dimensions of the pattern contrast regions may be determined. Once a pattern is optimized, the resulting information can be used to experimentally prepare each pattern of interest. Examples are provided below and in FIGS. 2 and 3 for $BPII_{(100)}$, $BPII_{(110)}$ and $BPII_{(111)}$.

Numerical simulations of a typical BPII with unit cell size $a_{BPII}$=150 nm, confined into a 2 μm-thick channel with homeotropic anchoring at the top and bottom surfaces were performed to analyze the system's response to confinement. Three monocrystalline reference states, namely $BPII_{(100)}$, $BPII_{(110)}$ and $BPII_{(111)}$, were simulated. Additional detail of the simulations is provided below in the Section VI.

FIGS. 1 (*a*)-(*c*) shows the corresponding topological defects (lattice disclination lines) and the average molecular orientation in the immediate vicinity of the homeotropic surface, along with a 2D-map of the behavior of the scalar order parameter (S), which measures the local degree of molecular ordering, evaluated in the immediate vicinity of the surface. In particular, FIG. 1(*a*) shows the defect structure of the BPII with different orientations. FIG. 1(*b*) is a close up of the BPII-topological line defects and molecular orientation at the proximity of uniform homeotropic interfaces. FIG. 1(*c*) shows scalar order parameter maps at the corresponding interfaces. To represent low and high values of S color maps that go from blue (disordered) to red (ordered) are used. In the case of the local director, the color corresponds to the projection of the molecular orientation onto the surface normal vector; as a result, blue directors are parallel to the surface, while red directors are perpendicular to the surface.

For each of the reference states, $BPII_{(100)}$, $BPII_{(110)}$ and $BPII_{(111)}$, there is a correlation between the symmetry of the S-maps and the preferred molecular alignment: a value of S=1 corresponds to a material that is perfectly homeotropic at the surface, whereas S≈0 corresponds to an isotropic, disordered region. The S-map allows one to identify which regions near the surface undergo costly elastic distortions as a result of the tendency of a material to adopt an average orientation that is different from that imposed by the surface anchoring. For instance, topological defects, which result from abrupt changes of the local molecular order and where there is no preferred molecular orientation, appear in the S-map as regions where an abrupt change of color occurs; in the bulk, such abrupt changes correspond to topological line defects that can be represented as the blue isosurfaces with S=0.35 shown in FIGS. 1 (a)-(c). Each BPII presents a near-surface S-map that is characteristic for a particular crystallographic orientation. By recognizing that, to first order, surface order maps provide an indication of the local strain (and therefore energetic cost) associated with presenting a particular crystallographic plane onto a surface, such maps provide a blueprint for creating patterns of planar and homeotropic regions whose aim is to relieve the elastic distortions induced by the surface. Moreover, the symmetry of the S-map appears to be essentially unaffected when the channel's thickness varies.

FIGS. 2(a)-(c) show particular designs to direct the BPII orientation along specific Miller indices given the information from the numerical simulations in FIGS. 1 (a) and (b). FIG. 2(a) shows a stripe pattern for $BPII_{(100)}$; FIG. 2(b) shows a rectangular-array pattern for $BPII_{(110)}$; FIG. 2(c) shows a circular-array pattern for $BPII_{(111)}$. Insets correspond to the S-map. The symmetry and spatial dimensions of the S-maps are simplified into binary patterns where red and blue sections correspond to homeotropic and planar regions, respectively.

Figure 3A:
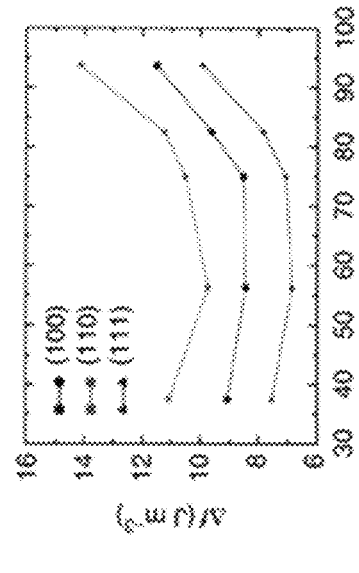
FIGS. 3(a)-(c) shows the free-energy density difference, $\Delta f = f - f_{Bulk}$.
Figure 3B:
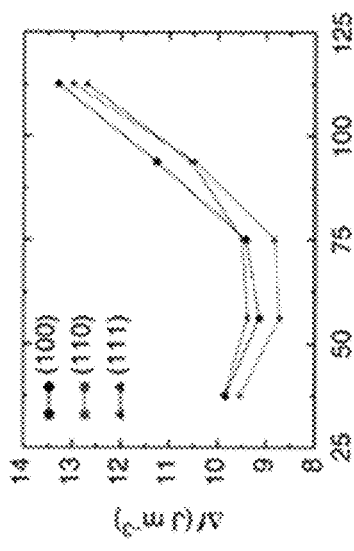
Figure 3C:
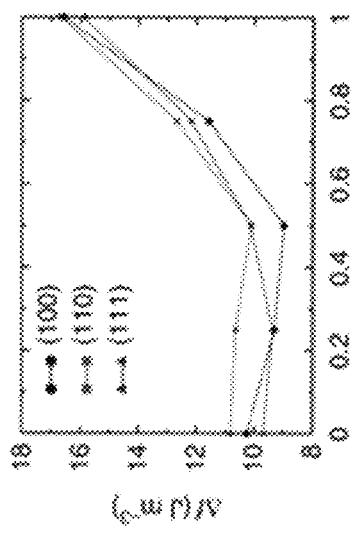
Figure 3D:
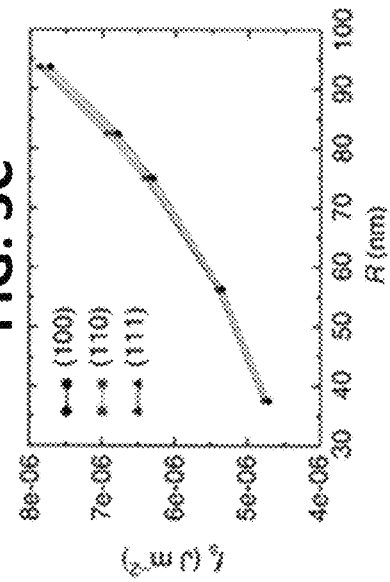
FIGS. 3(d)-3(f) shows the surface free energy density, $f_S$, as a function of different pattern parameters, for different BPII-lattice orientations: $BPII_{(100)}$ (circles), $BPII_{(110)}$ (squares) and $BPII_{(111)}$ (triangles).
Figure 3E:
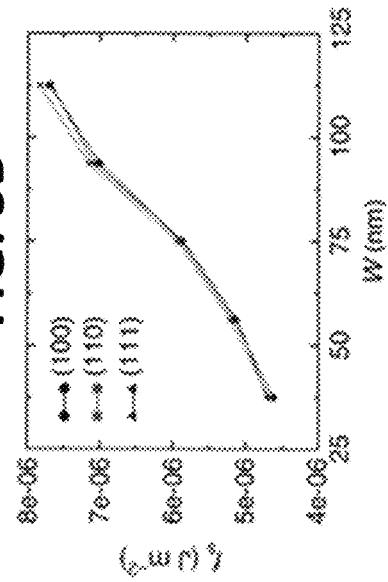
Figure 3F:
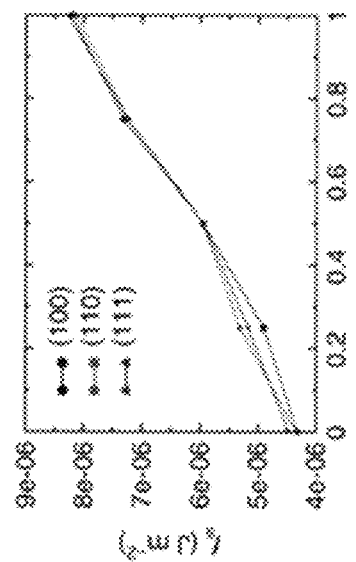

FIGS. 3(a)-(c) shows the free-energy density difference, $\Delta f = f - f_{Bulk}$, and FIGS. 3(d)-(f) shows the surface free energy density, $f_S$, as a function of different pattern parameters, for different BPII-lattice orientations: $BPII_{(100)}$ (circles), $BPII_{(110)}$ (squares) and $BPII_{(111)}$ (triangles).

The stripe-like pattern of FIG. 2(a) was designed to produce monocrystalline $BPII_{(100)}$ domains that reflect visible light with $\lambda_{(100)}$=450 nm. It was found from simulations using a Landau-de Gennes formalism (see Section VI) that the periodicity of the stripes is equal to the BPII-lattice constant; thereby, for the stripe-pattern design, the sum of the planar, P, and homeotropic, H, stripe widths was equal to the blue-phase lattice size (as indicated in FIG. 2(a)). The homeotropic ratio, HR=H/(P+H) was used to determine the proportion of planar and homeotropic contributions from the pattern.

FIG. 3(a) shows the free energy density difference between the confined system and its value in the bulk, $\Delta f$, as a function of HR for P+H=$a_{BPII}$=150 nm. While $BPII_{(111)}$ is the most favorable configuration for either uniform planar (HR=0) or uniform homeotropic (HR=1) anchoring, the stripe pattern reverses that trend by reducing the free energy of the $BPII_{(100)}$, which becomes the most stable orientation for 0.2<HR<0.8. A value of HR=0.5 is optimal (lowest $\Delta f$) for stripe patterns.

FIGS. 2(b) and 2(c) show hexagonal arrays of rectangles (FIG. 2(b)) and circles (FIG. 2(c)) of homeotropic anchoring over a planar background to stabilize $BPII_{(110)}$ and $BPII_{(111)}$, respectively. The parameters associated with the spatial distribution of these homeotropic regions depend on the size of the BPII unit cell, $a_{BPII}$, and the lattice orientation (see FIG. 2). For these nano-patterns, the area of the rectangles is 2W×W and the radius of the circular domains is denoted by r; by changing W and r in a systematic manner, one can determine the optimal conditions to produce single crystals of $BPII_{(110)}$ and $BPII_{(111)}$, respectively.

FIG. 3(b) shows the W-range over which $BPII_{(110)}$ becomes the stable configuration when the blue-phase is confined into a film on a rectangle patterned surface. $BPII_{(110)}$ is favored when HR is about 75 nm. In the case of the circle pattern, $BPII_{(111)}$ is the stable state for all values of r considered here, as shown in FIG. 3(c). It is important to note that, due to the strong anchoring conditions imposed by the pattern regions, the surface energies associated with different BP orientations are similar for all three cases considered above (FIGS. 3(d)-(f)); the overall behavior of the free energy, and the changes induced by the patterns, are primarily due to elastic distortions. As seen in FIGS. 3(a)-(f), the energetic cost associated with such distortions is minimal, and represents only a small fraction of the overall energy of the system. It is, however, sufficient to influence the orientation of the entire material over macroscopic regions. The main role of the patterned surface is therefore that of seeding the correct crystallographic orientation in the proximity of the interface, and favor the (100), (110) and (111) lattice orientations with stripes, rectangles and circles, respectively; these shapes, and the corresponding surface anchoring, induce a local deformation that prevents the material from adopting other, more unfavorable orientations. Based on these theoretical results, it is reasonable to infer that the patterned surfaces shown in FIG. 2 will direct the orientation of BPII films.

Figure 4A:
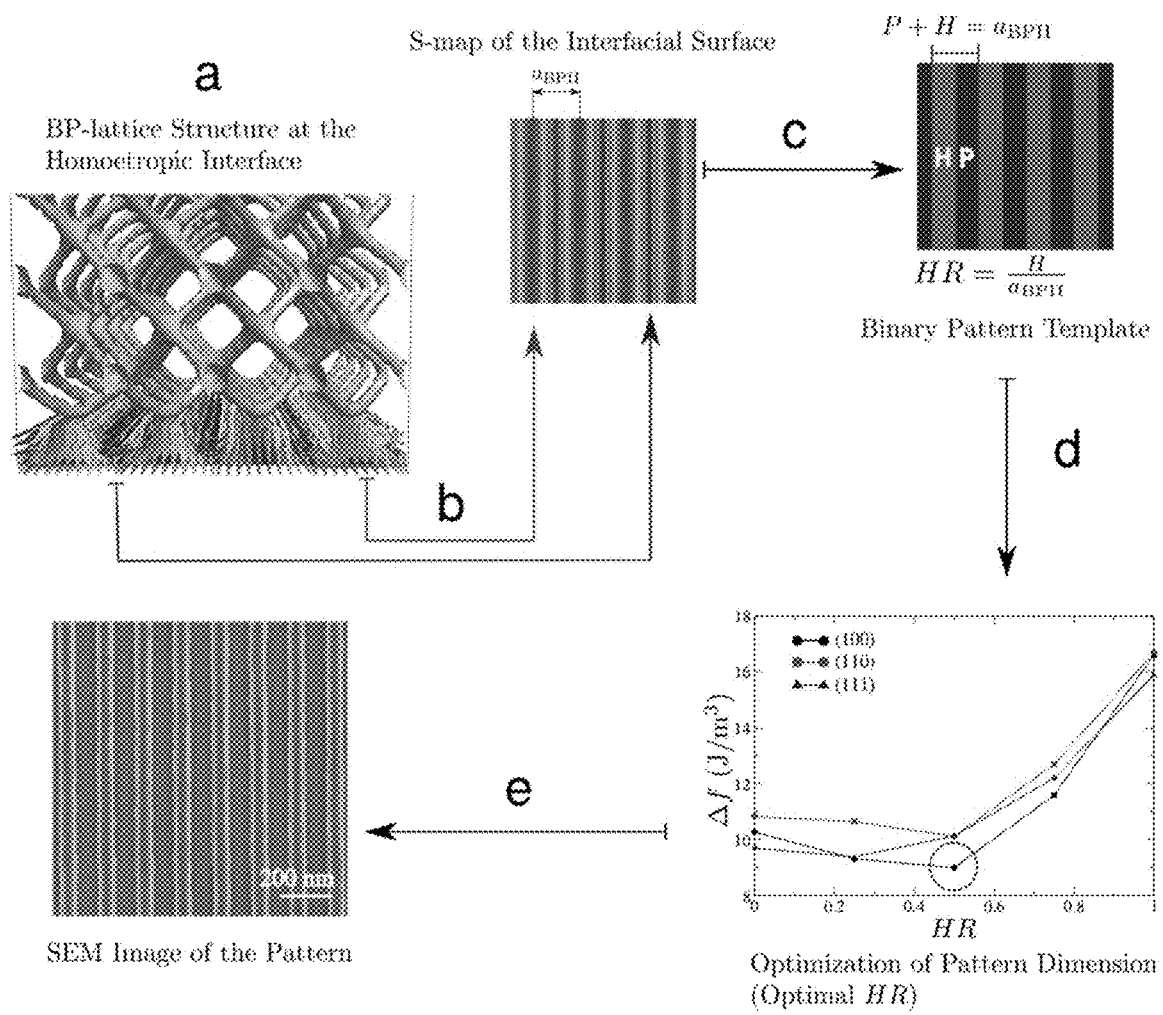
FIG. 4A provides a summary of a strategy according to certain embodiments of designing a pattern to direct the assembly of a monocrystaliine liquid crystal of arbitrary size.

FIG. 4A summarizes a strategy according to certain embodiments of designing a pattern to direct the assembly of a monocrystalline liquid crystal of arbitrary size. In the example of FIG. 4A, $BPII_{(100)}$ is shown, however, the strategy may be applied generally. As shown in FIG. 4A, the method may include the following: (a) Continuum simulations of a $BPII_{(100)}$ under uniform homeotropic conditions. (b) The S-map at the interface is correlated with the preferred molecular alignment. (c) The S-map is mapped into a binary pattern made of planar and homeotropic regions. (d) Theoretic field calculations are preformed to determine the dimensions of the homeotropic and planar regions. (e) Once the pattern is determined, a surface is patterned accordingly.

While the discussion above provides an example of certain methods of designing a pattern template, any appropriate method may be used. These include other simulation methods of determining surfaces that will induce local deformations that are energetically favorable to obtain a particular orientation. Further, the results presented herein including in FIG. 2 show that the patterns may have symmetries related to those in the unit cells of the bu'k. As such, an appropriate pattern may be found by trial and error with a limited number of patterns having related symmetries.

IV. Directed Self-Assembly of Single-Crystal Liquid Crystalline Blue Phases

Experiments were carried out on a silicone substrate with an approximately 5 nm-thick synthetic grafted polymer brush that imposes homeotropic anchoring on the planar substrate. Nano-patterns were produced through a lithographic process using e-beam on a polymer-covered surface. See Li, X. et al. "Directed self-assembly of nematic liquid crystals on chemically patterned surfaces: morphological states and transitions." *Soft Matter* 12, 8595-8605 (2016), incorporated by reference herein. The technique of Li et al. is particularly helpful in that it enables preparation of flat patterned surfaces that are devoid of micrometer-scale topographic steps. The chiral liquid crystals considered here were prepared by mixing the mesogen MLC 2142 with 36.3 wt % of the chiral dopant 4-(1-methylheptyloxycarbonyl) phenyl-4-hexyloxybenzonate (S-811). This mixture produces a BPI and a BPII with lattice sizes aBPI≈255 nm and aBPII≈150 nm, respectively.

This liquid crystal mixture was confined into 3.5 μm-thick slits with homeotropic anchoring on the top surface and a 0.25 mm² patterned area on the bottom surface. To provide a reference for the influence of the patterns, in all samples the patterned area was surrounded by a region of uniform homeotropic anchoring.

Figure 4B:
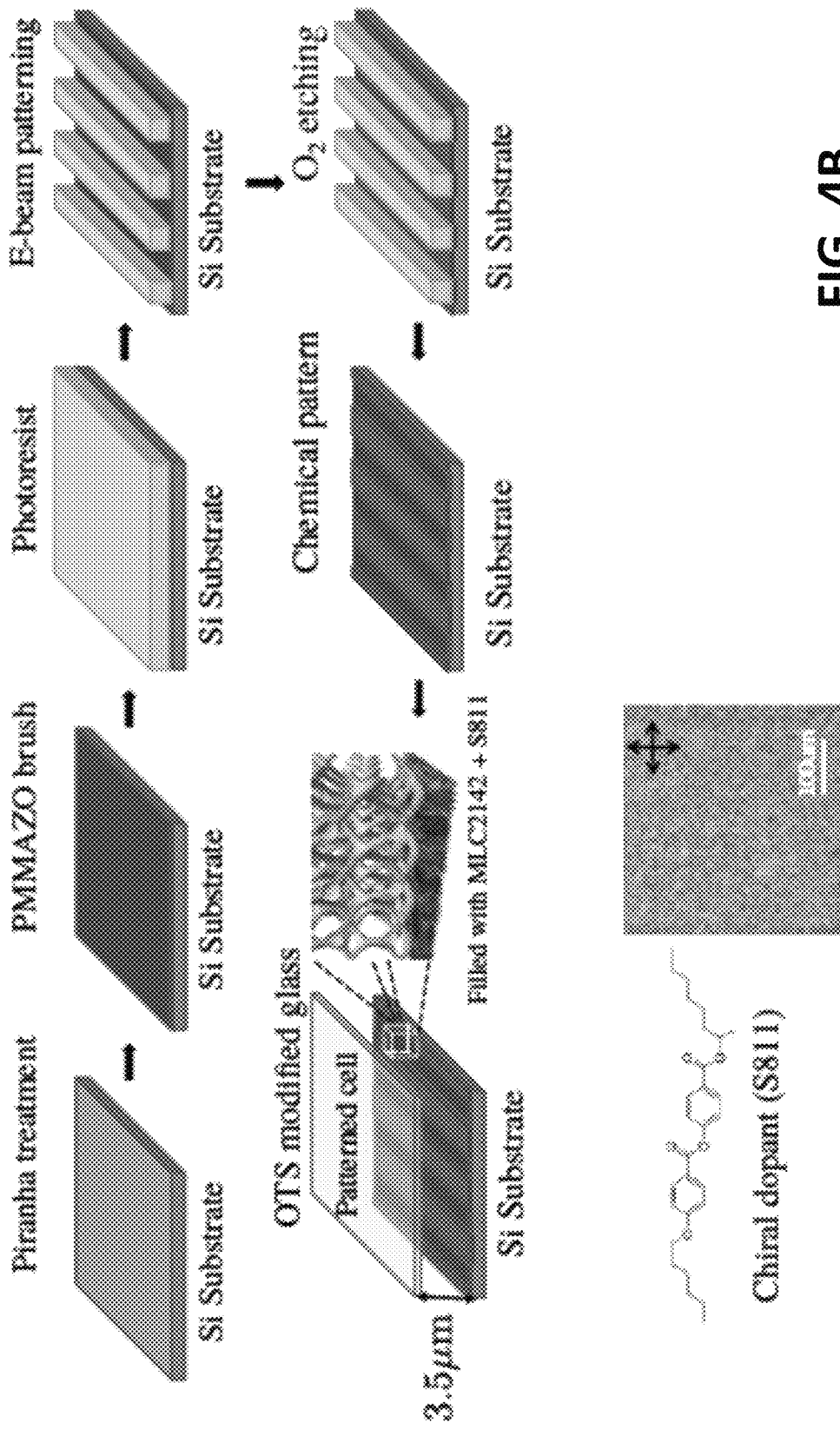
FIG. 4B shows various operations in the fabrication of a chemically patterned surface and formation of a liquid crystal cell including the chemically patterned surface.

FIG. 4B shows various operations in the fabrication of a chemically patterned surface and formation of a liquid crystal cell including the chemically patterned surface. The chiral dopant S811 is added to the liquid crystal MLC2142 to produce the chiral liquid mixture used in the experiments. At morn temperature a cholesteric phase texture is exhibited, as shown in the micrograph on the right.

Following the pattern designs determined above, for the stripe patterns HR=0.5 and aBPII=150 nm, for the rectangular and circular patterns 2W=2r=aBPII was used. In this way, all the patterns are produced in terms of the unit cell size, a feature that is useful for extending the results described herein to systems having different chirality.

Figure 5A:
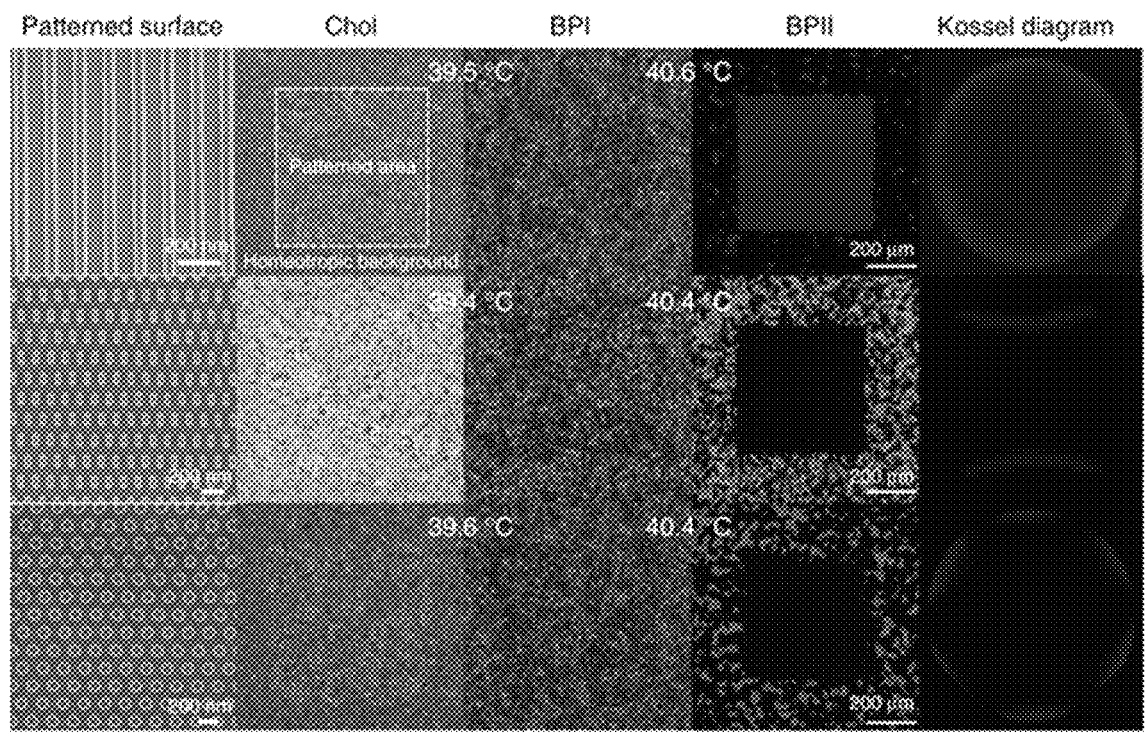
FIG. 5(a) shows SEM images of three different patterned surfaces, along with the corresponding optical micrographs of the cholesteric and blue phases I and II and the Kossel diagrams of the blue phase II (BPII) in the patterned area.

FIG. 5(a) shows SEM images of three different patterned surfaces, along with the corresponding optical micrographs of the cholesteric and blue phases I and II and the Kossel diagrams of the BPII in the patterned area. The Chol-BPI and BPI-BPII transition temperatures for each case are also indicated. As predicted by the theoretical results discussed above, each pattern stabilizes the BPII orientation for which it was designed to stabilize. The resulting single-crystal monodomains are as large as the patterned area.

As one can see from FIG. 5(a), the patterned surfaces do not significantly affect the structural and thermal behavior of the Chol and BPI phases. For BPII, however, our results demonstrate that patterns induce the formation of a single-crystal blue-phase II specimen over the entire patterned area, with no platelet-like domains or grain boundaries. In all cases, the micrographs were taken for light normally incident in the reflection mode of a cross polarizer. As predicted, the stripe pattern (FIG. 5(a) top) induces a $BPII_{(100)}$ single crystal, which reflects light with wavelength $\lambda_{(000)}$≈450 nm; the rectangle and circle patterns (FIG. 5(a) center and bottom) give rise to $BPII_{(110)}$ and $BPII_{(111)}$ single crystals, respectively. They appear black in the images because the reflected light in this case is outside the visible spectrum ($\lambda_{(110)}$≈318 nm, $\lambda_{(111)}$≈260 nm).

Kossel diagrams were obtained using monochromatic light with λ=405 nm; the lines shown in these diagrams correspond to light reflected by the (100) planes, and reveal the lattice orientation of the blue-phase. The measurements are consistent with theoretically and experimentally determined Kossel diagrams, and confirm the existence of the (100) and the (110)-lattice orientations on the stripe and rectangle patterns, respectively. For the circle pattern, the symmetry of the diagram can be explained by analyzing the lattice structure of the $BPII_{(111)}$ in the proximity of the patterned surface. Such a structure depends on the channel thickness, and is consistent with the formation of a hexagonal blue-phase (BPH) layer at the wall, as revealed by the symmetry of line defects. As the name indicates, the hexagonal blue phase is a hexagonal array of double twist cylinders; the corresponding Kossel diagram agrees with that shown in FIG. 5(a) for the circular pattern. Simulation results show that the circular pattern produces a $BPII_{(111)}$ monodomain where the lattice structure adopts a hexagonal symmetry in the vicinity of the patterned surface, and this structure is revealed experimentally by the Kossel diagram.

Figure 5B:
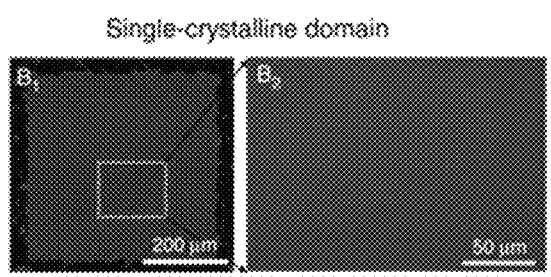
FIGS. 5(b) and 5(c) show reflected light optical images of the blue phase cell under crossed polarizers.
Figure 5C:
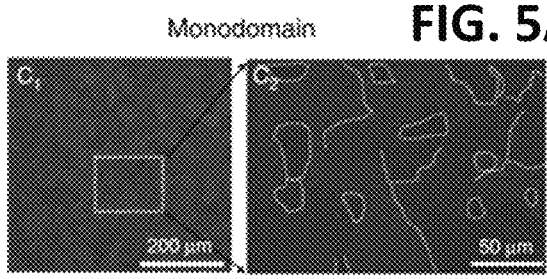

Additional experimental evidence for the single-crystal characteristic of the domains produced by the process outlined is also obtained from the Kossel diagrams. In a single crystal, Kossel diagrams obtained from different regions of a sample should be identical. In contrast, a polycrystalline mono-domain, platelets having different x-y orientations produce Kossel diagrams that differ in their relative orientation. FIGS. 5(b) and 5(c) show reflected light optical images of the blue phase cell under crossed polarizers: FIG. 5(b) shows the single crystalline domain on stripe patterned surface; FIG. 5(c) shows the monodomain adjacent to the stripe pattern area. The Kossel diagrams correspond to the right and left sides of the zoomed-in images. The Kossel diagrams extracted from different regions of the single-crystals produced here have the same orientation, whereas those extracted from polycrystalline monodomains do not.

As described above, the pattern templates were designed on the basis of theoretical results from a tensorial description of the preferred local molecular orientation of the chiral liquid crystal in the proximity of a planar or homeotropic interface. The order parameter is able to identify and report regions of high elastic distortions, which a surface pattern is able to relieve. The preferred orientation of the blue phase is thus mediated by the strain imposed by a patterned surface, and the generality of this concept is established by designing different patterns that stabilize different orientations along the $BPII_{(100)}$, $BPII_{(110)}$ and $BPII_{(111)}$ crystallographic lattice planes.

It should be noted that these results are different from reports of square-like patchy patterns used to induce formation of Skyrmion-like phases in non-chiral liquid crystals (See Cattaneo, L. et al. *Electric field generation of Skyrmion-like structures in a nematic liquid crystal.* Soft Matter 12, 853-858 (2016)). The molecules of these phases form chiral twists the entire phase does not possess a crystalline symmetry—unlike the chiral phases described here.

The strategy presented here to create single-crystals can be generalized and can be applied to other phases, including the blue phase I. FIGS. 6(a)-(d) summarize a process for obtaining a single-crystal of the $BPI_{(110)}$, where the blue-phase lattice parameter is $a_{BPI}$=260 nm. The pattern in this case consists of a hexagonal arrangement of rectangles. In particular FIG. 6(a) shows an image from numerical simulations of a confined BPI with (110)-lattice orientation; FIG. 6(b) shows Director field and S-map analysis; FIG. 6(c) shows determination of the binary pattern template; and FIG. 6(d) shows fabrication of the chemically patterned surface and experiments to obtain the desired BPI single crystal.

FIG. 7 shows the reflection spectrum of the Chol phase, and the polycrystalline and single-crystal domains of BPI and BPII, respectively. The Chol phase exhibits a constant intensity value of reflected light, while BPI and BPII show highly selective light reflection according to their crystalline structure. As can be appreciated from FIG. 7, single-crystal blue-phase domains exhibit a marked improvement in the intensity of reflected light when compared to polycrystalline samples. Polycrystalline domains give rise to spectra with multiple peaks, which are a consequence of the non-uniform lattice orientation of different platelets in the samples; the spectra for single-crystal domains have a single, sharp peak, which is consistent with the uniformity of the lattice orientation in the entire sample.

As indicated above, the surface pattern may vary somewhat and still induce a single crystal. As described above, a stripe pattern having a 150 nm period ($L_s$=150 nm=width of two adjacent stripes) with alternate 75 nm homeotropic and 75 nm planar anchoring stripes was used to direct the assembly of double-twist cylinder structures into homogeneous, single-crystal BPII that adopt a (100) lattice orientation.

Figure 9:
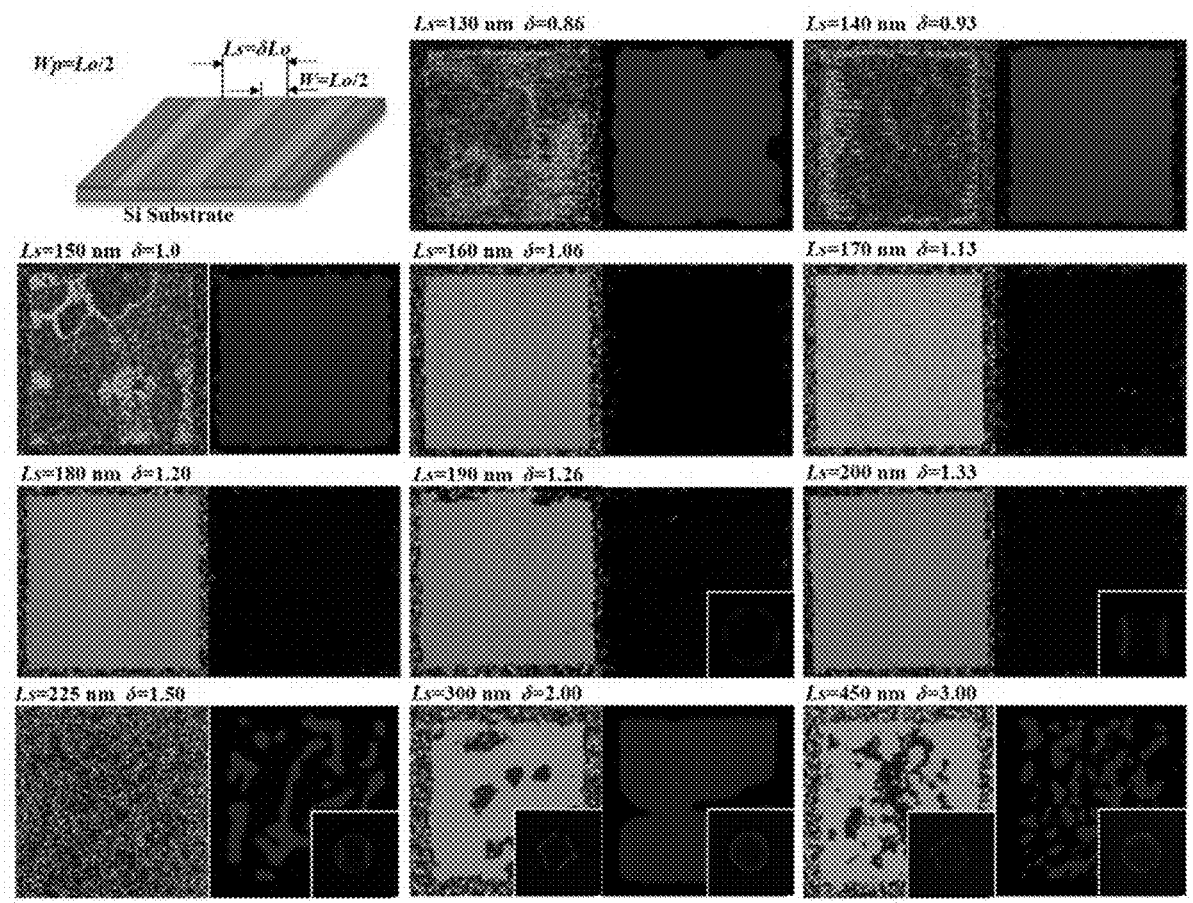
FIG. 9 shows pairs of images of directed assembly of BPI on stripe patterns having various length scales, with the left image of each pair being $BPI_{100}$ and the right image being $BPII_{100}$.

Assembly of BP liquid crystals on stripe patterns with varying $L_s$ ($L_s$ being the width of two adjacent stripes) and the width of planar anchoring stripe ($w_p$) was kept as 75 nm, or the width of planar ($w_p$) and homeotropic ($w_h$) anchoring was kept as equal to each other. The patterns may also be characterized in terms of δ with δ=$L_s/L_o$, $L_o$ being the lattice constant of 150 nm. BPI and BPII crystals were formed (BPI at temperatures between 39.7° C. and 40.6° C. and BPII at 40.6° C.-42.8° C.). FIG. 9 shows the resulting images for each pattern, with the left image being BPI$_{100}$ and the right image being BPII$_{100}$. For the period $L_s$=130 nm-150 nm, patterns result in a single crystal of BPII; for the period Ls=160 nm-200 nm, patterns result in a single crystal of BPI. These results indicate that the alternative planar/homeotropic anchoring stripe pattern has a period window to selectively stabilize both BPI (110) and BPII (100), with a processing window of $L_s$ to obtain single crystals for both BPI and BPII.

Figure 10A:
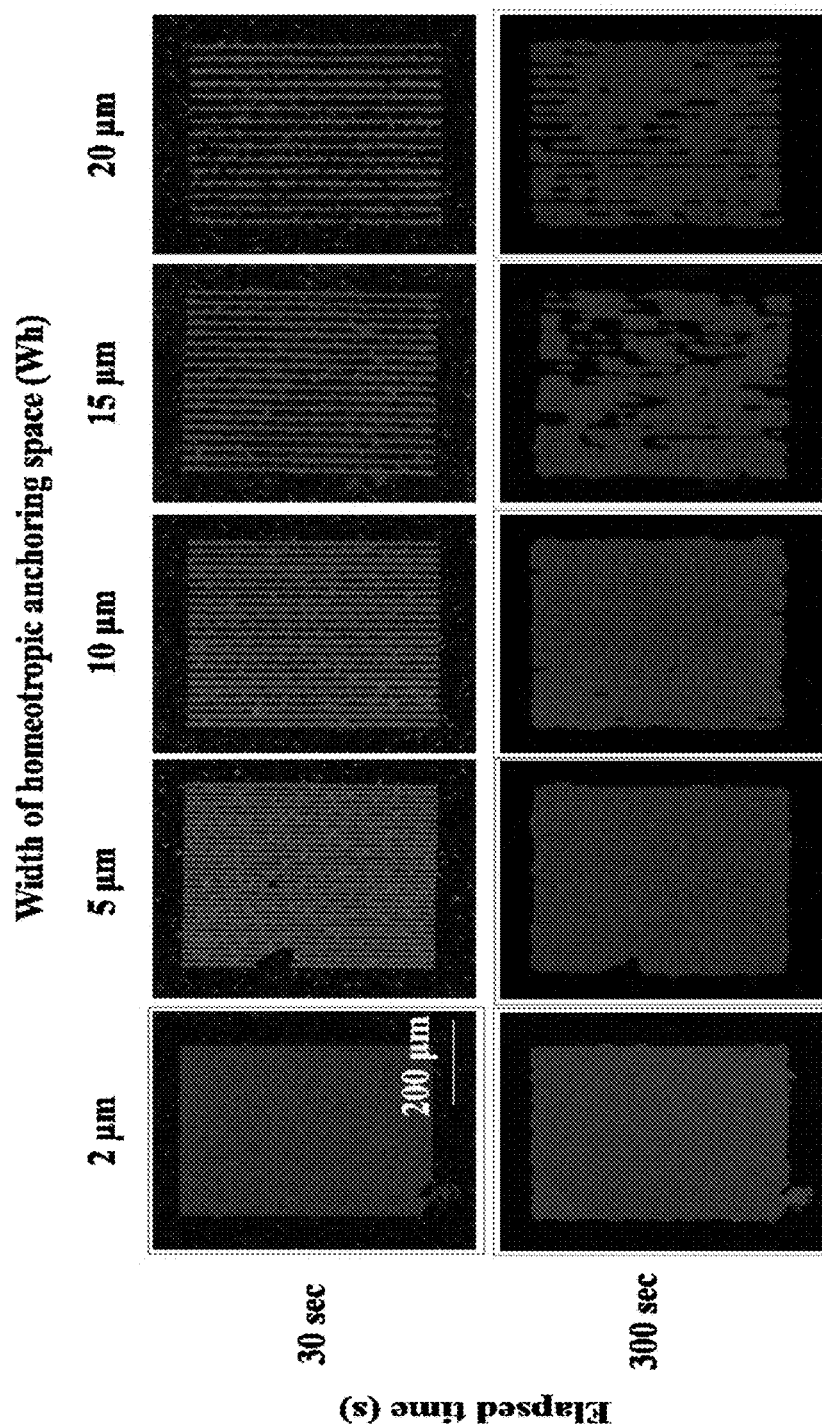
FIG. 10A shows images of directed assembly of blue phase materials on stripe patterns of varying density.

In some embodiments, the pattern density may be decreased. FIG. 10A shows results of assembly of a MLC 2142 mesogens mixed with 36.32 wt % of the chiral dopant 4-(1-methylheptyloxycarbonyl)phenyl-4-hexyloxybenzoate (S-811) on stripe patterns of varying density. The blue phases of the chiral liquid crystal are characterized by unit cell sizes $a_{BPI}$=255 nm and $a_{BPII}$=150 nm for the BPI and BPII, respectively. The LC is confined into a hybrid-anchored channel with a thickness of 3.5 μm. The hybrid cell includes a modified OTS glass surface at the top that imposes a homeotropic alignment to the LC molecules and a chemically prepared patterned surface at the bottom, with regions that impose planar and homeotropic anchoring alignments. A stripe pattern with alternating planar and homeotropic regions was used to obtain single crystal on the whole pattern area. The density of the patterned area was reduced by having only homeotropic anchoring regions between two regions of stripes. FIG. 10A shows the growth after 30 seconds and 300 seconds for unpatterned homeotropic anchoring regions of various widths. For this particular system, it was found that if the distance between stripes was 15 μm or less, the single crystal grows over the area between the stripes. A reduced pattern area to achieve a single crystal may be useful to reduce patterning requirements. In addition, in some embodiments, it may be advantageous to have less "pinning" regions for switching applications. That is, reducing the patterned area that induces a certain orientation may reduce the electric or magnetic field needed to switch the orientations.

In some embodiments, a substrate may include different adjacent patterns to stabilize different orientations with a sharp crystal boundary. As described above, the chemical pattern determines the specific phase (e.g., BPI or BPII) as well as which orientation of the unit cell in the out of film direction. Adjacent chemical patterns, each of which drives a different orientation can be used to generate a film that includes adjacent single crystal regions having different orientations, with a single defect line between them. This can be useful in applications such wavelength-dependent diffraction gratings. Adjacent chemical patterns can also be used to drive adjacent single crystal regions of different phases. For example, the adjacent regions could be BPI$_{(110)}$ and BPII$_{(100)}$, with the different phases appearing one after another due to temperature differences. This can be useful in temperature-dependent applications.

Figure 10B:
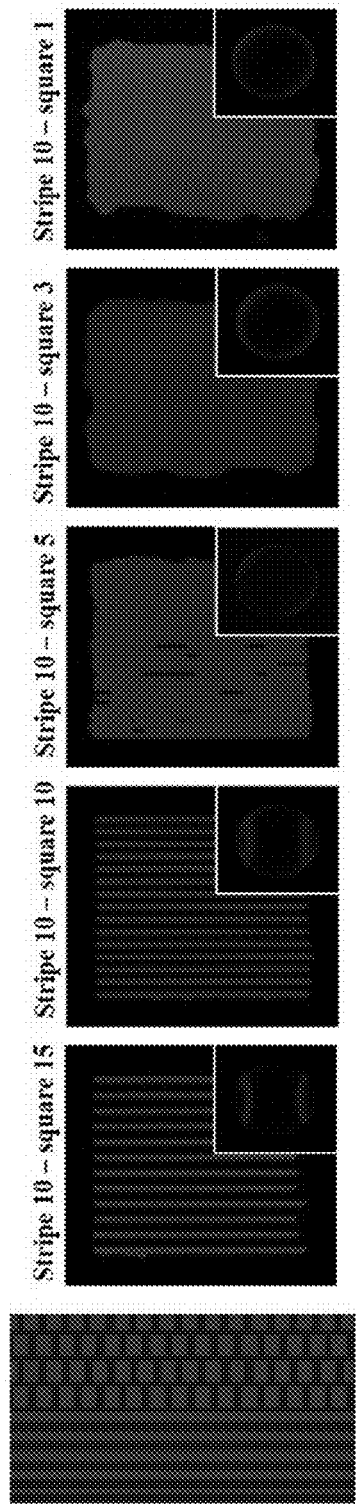
FIG. 10B shows images of directed assembly on surfaces that include adjacent patterns that each drives a different orientation of a blue phase material.

FIG. 10B shows images of directed assembly on surfaces that include alternating patterns. In the example of FIG. 10B, the patterns include a stripe array of alternating planar and homeotropic anchoring stripes (each one with 75 nm width) adjacent to a square shape homeotropic pattern inside of the planar anchoring background, with total patterned area 440 μm×440 μm. An example of adjacent stripe and square patterns is shown in the leftmost image. The length of the patterned area was kept as 440 μm. The width of the stripe array area was kept as 10 μm, and the width of adjacent square pattern area was varied from 1 μm to 15 μm. For square widths of 1 μm and 3 μm the BPII$_{(100)}$ grows all over the alternate pattern area as a single crystal. When the width of the square shape pattern region increased to 5 μm, there are still a few rectangular regions remaining black, which should orient the (110) plane. As the width of the square region is increased to 10 μm, the nucleation and growth of the BPII$_{(100)}$ and BPII$_{(110)}$ registered on their own preferred pattern surfaces and do not disturb each other. The boundary of two adjacent (100) and (110) plane is straight and sharp without any crossover growth or bridge for any of the adjacent regions. The Kossel diagrams (inset) clearly show the alternate black region in the pattern area represent (110) lattice plane. For this system, 10 μm is the minimum size to stabilize the BPII$_{(hkl)}$ domains without flipping to another lattice orientation. Based on the above knowledge, we can use the alternating pattern geometries to design surface for stabilizing different lattice planes of BPII at same time, which can be used for photonic crystals.

According to various embodiments, the liquid crystals may be directed to assemble in the absence or presence of an external field. In some embodiments, directed assembly on a patterned surface may be aided by an external field such as an electric field, a magnetic field, or a shear field. Switching of blue phases by an electrical field is also important for various applications and is discussed further below.

V. Applications

The approach described above of directed assembly of single-crystal blue phases and other phases provides a platform for development of devices that permit full exploitation of the structural and electro-optical properties of blue phases and other chiral liquid crystal phases.

Figure 10C:
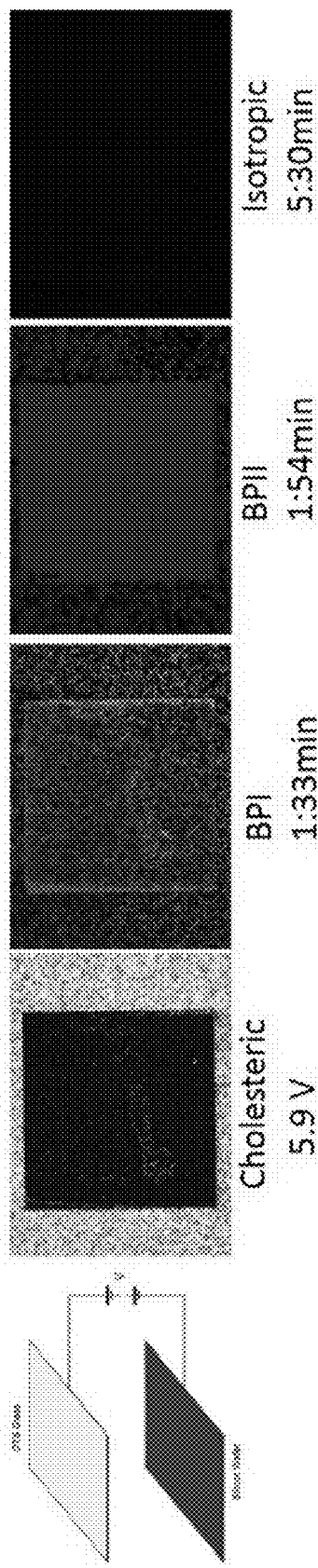
FIG. 10C shows images of cholesteric, BPI, BPII, and isotropic phases of a liquid crystal material resulting from application of electrical field.

In some embodiments, electro-optical devices including the single-crystal materials are provided. By removing polydomain structures and grain boundaries, key properties of an optical device, such as its transmission and response time, can be enhanced significantly. In some embodiments, liquid crystal displays including the single-crystal materials are provided. Other examples include liquid crystal lasers, fast light modulators, tunable photonic crystals and other switchable devices. FIG. 10C shows images of cholesteric, BPI, BPII, and isotropic phases of a liquid crystal material resulting from application of electrical field, as discussed further below in Section VII. The materials described herein may be incorporated into a liquid crystal display, which may include other components as described in U.S. Patent Publication No. 20120105751, incorporated by reference herein.

Figure 11:
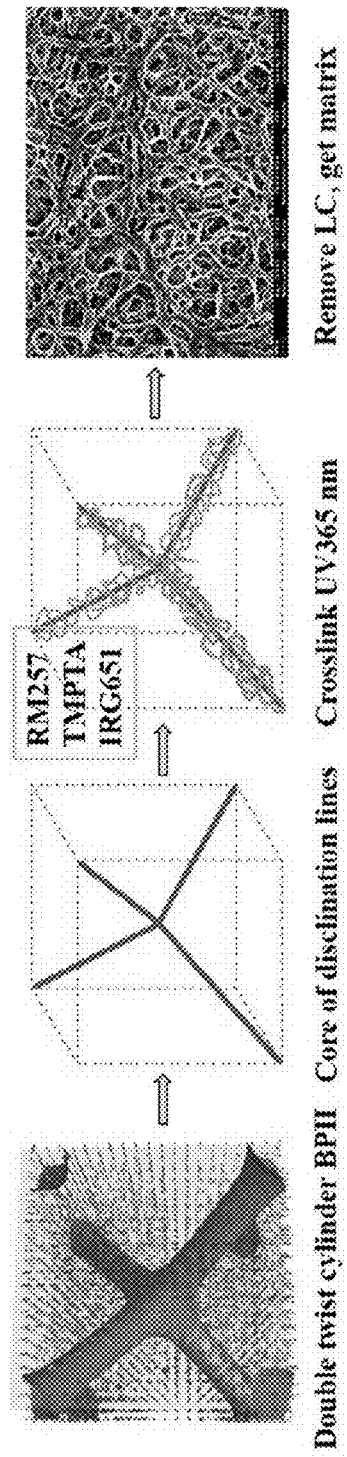
FIG. 11 shows a free-standing structure formed from a BPII single crystal material.

In some embodiments, the materials may be used as templates for various applications including membranes, filters, and photonic applications. For example, free-standing three-dimensional nanostructures may be formed by polymerizing material in the disclination regions and washing away the surrounding blue phase crystals. Formation of free-standing three-dimensional nanostructures from blue phases is described in Castles et al. *Blue-phase templated fabrication of three-dimensional nanostructures for photonic applications*, Nature Mater. 11, 599 (2012), which incorporated by reference herein and in Section VII, below. FIG. 11 shows a free-standing structure formed by the method described in Section VII: a BPII single crystal material is formed on a patterned surface, the disclination lines are cross-linked on exposure to ultraviolet radiation, and the liquid crystals are removed, leaving a free-standing three-dimensional nanostructure. Such three-dimensional nanostructures may be used as filters, membranes, or filled with liquid crystal for photonic applications. One having skill in the art will understand that other methods may be used to form free-standing three-dimensional nanostructures from the material described herein. For example, one of the phases of the material may be mixed with small molecules, nanoparticles, polymerizable materials, etc., and then treated by polymerization, sintering, etc. to make it robust. The other phase may then be removed. Either the defect structures or the double twist cylinders may be modified or removed depending on the desired application.

VI. Simulation Method

The free energy, F, of the chiral liquid crystal considered was described in terms of a continuum mean field Landau-de Gennes formalism. In this model F=F(Q), where Q is the tensor order parameter, defined by $Q_{ij}=S (n_i n_j - \frac{1}{3} \delta_{ij})$. Here i,j=1, 2, 3, and $n_i$ are de x, y, z components of the local director vector; S is the scalar order parameter, given by $S=<3/2 \cos^2 \theta - \frac{1}{2}>$, with $\cos \theta = a \cdot n$, where a is the molecular orientation and < > denotes a spatial average. Thus, the tensor order parameter contains the structural information of the liquid crystalline phase.

The free energy functional accounts for short-range ($f_P$), long-range elastic ($f_E$) and surface ($f_S$) contributions, i.e., $$F(Q)=\int d^3x [f_P(Q)+f_E(Q)]+\int d^2x f_S(Q), \quad (1)$$

where the short-range contribution is given by $$f_P = \frac{A}{2}\left(1 - \frac{U}{3}\right)tr(Q^2) - \frac{AU}{3}tr(Q^3) + \frac{AU}{4}tr(Q^2)^2. \quad (2)$$

In Equation (2), A and U are phenomenological parameters that depend on temperature and pressure. The long-range elastic contributions to the free energy are given by $$f_E = \frac{1}{2}\left[L_1 \frac{\partial Q_{ij}}{\partial x_k}\frac{\partial Q_{ij}}{\partial x_k} + L_2 \frac{\partial Q_{jk}}{\partial x_k}\frac{\partial Q_{jl}}{\partial x_l} + \right. \quad (3)$$

$$\left. L_3 Q_{ij}\frac{\partial Q_{kl}}{\partial x_i}\frac{\partial Q_{kl}}{\partial x_j} + L_4 \frac{\partial Q_{jk}}{\partial x_l}\frac{\partial Q_{jl}}{\partial x_k} + L_5 2q_0 \epsilon_{ikl} Q_{ij} \frac{\partial Q_{lj}}{\partial x_k}\right],$$

where $\epsilon_{ikl}$ is the Levi-Civita tensor, $q_0=2\pi/p$ is the inverse of the pitch and measures the chirality of the system. $L_i$'s are the elastic constant of the liquid crystal. The last term of Eq. 1 corresponds to the surface contributions to the free energy. The patterned surfaces considered in this work include regions with planar and homeotropic anchoring. In the first case, a molecular orientation parallel to the surface is imposed, but without any preferential direction on the plane; this condition is referred to as planar degenerate anchoring, and the corresponding free energy is given by $$f_S^P = W_P(\tilde{Q}-\tilde{Q}^\perp)^2 + W_P(\tilde{Q}:\tilde{Q}-S_0^2)^2, \quad (4)$$

where $S_0$ is the surface preferred degree of order, $W_P$ is the planar anchoring energy, $\tilde{Q}=Q+SI/3$ and $\tilde{Q}^\perp=P\tilde{Q}P$, P is the projection operator $P_{ij}=\delta_{ij}-v_i v_j$ and v is the vector normal to the surface. For the homeotropic region, surface contributions to the free energy are given by, $$f_S^H = \frac{1}{2}W_H(Q-Q^0)^2, \quad (5)$$

where $W_H$ is the homeotropic anchoring energy and $Q^0$ is a surface-preference tensor order parameter.

Stable and metastable states were found by minimization of the free energy; this was achieved by means of a Ginzburg-Landau relaxation method where Q evolves toward equilibrium according to $$\frac{\partial Q}{\partial t} = -\frac{1}{\gamma}\left[\prod\left(\frac{\delta F}{\delta Q}\right)\right], \quad (6)$$

with boundary conditions such that $\Pi[(\delta F/\delta \nabla Q)\cdot v]=0$. Parameter $\gamma$ represents a diffusion coefficient and the operator $\Pi(B)=\frac{1}{2}(B+B^T)-\frac{1}{3}tr(B) I$ ensures the symmetric and traceless properties of the Q-tensor parameter. Initial configurations for BPI and BPII where generated as follows: for BPI:

$$Q_{xx}=A(-\sin(ky/\sqrt{2})\cos(kx/\sqrt{2})-\sin(kx/\sqrt{2})\cos(kz/\sqrt{2})+2\sin(kz/\sqrt{2})\cos(ky/\sqrt{2})) \quad (7a)$$

$$Q_{xy}=A(-\sin(kx/\sqrt{2})\sin(kz/\sqrt{2})-\sqrt{2}\cos(ky/\sqrt{2})\cos(kz/\sqrt{2})+\sin(kx/\sqrt{2})\cos(ky/\sqrt{2})) \quad (7b)$$

For BPII:

$$Q_{xx}=A(\cos kz - \cos ky) \quad (8a)$$

$$Q_{xy}=A \sin kz, \quad (8b)$$

where the strength of the chirality is given by $k=2q_0 r$ and r is the redshift, which was found to be 0.71 for BPI and 0.86 for BPII. The amplitude of initialization is A=0.2. The blue-phase lattice parameters for BPI ($a_{BPI}$) and BPII ($a_{BPII}$) are related to the chiral pitch and the red shift as follows:

$$a_{BPI} = \frac{p}{\sqrt{2}r}, a_{BPII} = \frac{p}{2r}.$$

In all cases, the components yy, zz, xz and yz were obtained by cyclic permutation of those given above.

Figure 8:
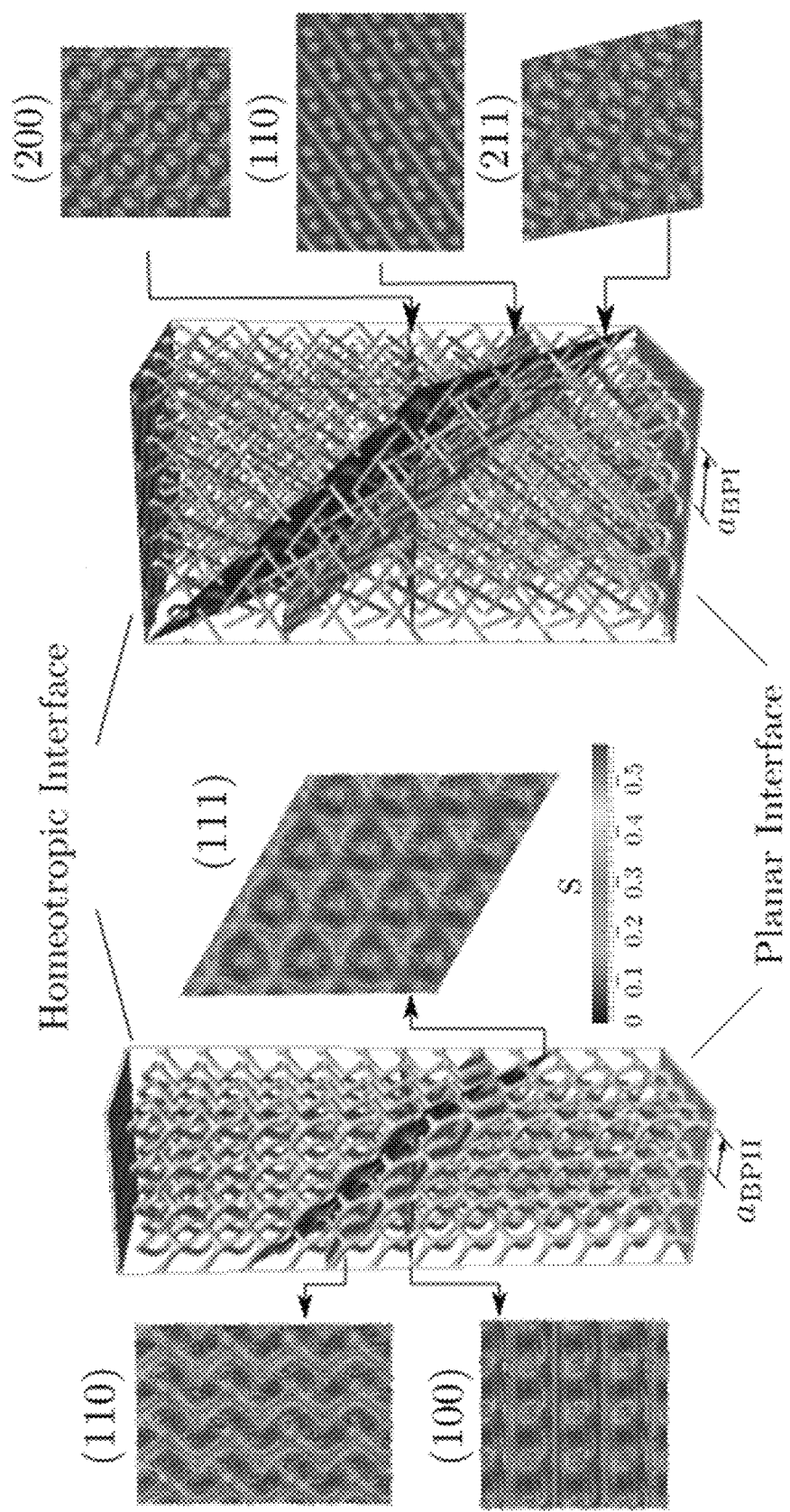
FIG. 8 shows results of a simulation with blue-phase topological defects visualized as isosurfaces of the scalar order parameter with S=0.35 for BPII and S=0.42 for BPI.

For the description of the system a lattice array with a mesh resolution of 7.5 nm, and typical values of anchoring energies i.e., $W_P=4\times10^{-3}$ Jm$^{-2}$ and $W_H=8\times10^{-4}$ Jm$^{-2}$ were used; for the chiral liquid, the following values, which were found to match experimental observations (11,12), $A=1.067\times10^5$ Jm$^{-3}$, $L_1=6$ pN and $L_5=2L_1$ were used. For blue phases, a chiral pitch of 258 nm, U=2.755 for BPII and U=3.0 for BPI. For simulations, the elastic constant, $L_1$, the coherence length, $\xi_C=\sqrt{L_1/A}$, and the extrapolation length, $\xi_S=L_1/W$, to reduce variables as follows: $r^*=r/\xi_C$; $W^*=\xi_C/\xi_S$; $F^*=F/(L_1\xi)$ were used. The reduced temperature, $\tau$, is related to the U parameter through $\tau=9(3-U)/U \propto (T-T^*)$, where $T^*$ is the isotropic-cholesteric transition temperature whose value depends on the material. Blue-phase topological defects were visualized as isosurfaces of the scalar order parameter with S=0.35 for BPII and S=0.42 for BPI. See FIG. 8.

To compare the stability of blue phases having different lattice orientations with respect to the patterned surface, proper initial conditions based on the ansatze of the corresponding structures were considered. The spatial dimensions, Lx and Ly, of the simulation box depend on the orientation of the blue phase. Specifically, for a BPII oriented with the (100)-plane parallel to the surface ($BPII_{(100)}$), a lattice array where Lx and Ly are multiples of the BPII-unit cell a was used; as the unit cell lattice parameter is a=150 nm, a simulation box with $L_x=L_y=600$ nm was considered. For the $BPII_{(110)}$ case, the phase respect to the x-direction was rotated keeping $L_x=600$ nm but changing $L_y$ to a multiple value of $2^{1/2}$a; $L_y=1275$ nm, which corresponds to approximately 6.01 lattices with the (110) plane parallel to the surface, was chosen. The channel thickness was kept at $L_z=2100$ nm. Special attention should be paid to the system's dimensions in order to properly describe the material; failure to do so can lead to distorted structures that have little resemblance to the system's actual behavior.

After the minimization process, free energy densities corresponding to different blue-phase orientations for a given patterned surface were compared by taking as a reference the free energy of the blue-phase in the bulk, i.e. under periodic boundary conditions.

VII. Experimental Methods and Materials 36.3 wt % 4-(1-methylheptyloxycarbonyl)phenyl-4-hexyloxybenzoate (S-811) in MLC 2142 mixtures were prepared by using toluene as a co-solvent. After mixing with an ultrasonic cleaner, toluene was evaporated overnight under vacuum at 60° C.

A 4-5 nm thick poly(6-(4-methoxy-azobenzene-4'-oxy) hexyl methacrylate) (PMMAZO) film was deposited on an oxygen-plasma cleaned silicon substrate and annealed at 250° C. for 5 min under vacuum. Non-grafted PMMAZO was removed by sonication in chlorobenzene, and the remaining PMMAZO brush was found to be around 4.5 nm thick.

A 40-nm-thick GL2000 photoresist film was deposited onto the PMMAZO brush and baked at 160° C. for 5 min. Striped patterns were exposed on the resists using electron beam lithography (EBL) with the JEOL 9300FS electron-beam writer at the Center for Nanoscale Materials, Argonne National Laboratory. Exposed substrates were developed with n-amyl acetate for 15 s and rinsed with isopropyl alcohol. The resulting resist pattern was transformed onto a chemical pattern on the PMMAZO brush layer by exposing the sample to an oxygen plasma, followed by stripping the GL2000 photoresist in chlorobenzene.

The glass microscope slides were modified by Octadecyltrichlorosilane (OTS). The OTS glass and the Si substrate with the PMMAZO chemical patterns were placed face-to-face, with a 3.5 μm spacer, to define the cell thickness. The optical cell and the LC were heated above the clearing point, and S-811/MLC 2142 mixtures were injected through capillary action. The system was then slowly cooled down to room temperature. At this point the sample was ready for the following thermal process: experiments were started by heating a cholesteric phase from 25° C. to 39.6° C. During this process no visible changes were observed. A heating rate of 0.5° C. per min was then used to reach 39.6° C. At this point, a slower heating rate in which we changed the temperature by 0.2° C. every 3 minutes was used.

Optical characterization was performed using the cross-polarized and reflection modes of an Olympus BX60 microscope with a 10× and a 50× objective. Samples were heated up to the isotropic phase using Bioscience Tools TC-1-100s temperature controller controlling hot stage at a rate 0.2° C. every 3 min. Kossel diagrams were used to identify the type of blue phase and determine the crystal orientation.

UV-vis spectra of BP samples were carried out using spectrometer (USB4000, Ocean Optics). MLC 2142 and 4-(1-methylheptyloxycarbonyl)phenyl-4-hexyloxybenzoate (S-811) were purchased from Merck. Fisher Finest Premium Grade glass slides and coverslips were obtained from Fisher Scientific. Octadecyltrichlorosilane (OTS), chlorobenzene, isopropyl alcohol and n-amyl acetate were purchased from Sigma-Aldrich and used without further purification.

Switch of blue phases by electric field: To switch blue phases by electric field, an OTS modified ITO glass and the Si substrate with the PMMAZO chemical patterns as described above were placed face-to-face, with a 3.5 μm spacer, to define the cell thickness. The optical cell and the LC were heated above the clearing point, and S-811/MLC 2142 mixtures were injected through capillary action. The system was then slowly cooled down to room temperature.

At this point the sample was ready for the following electric field process: two electrodes were added on the silicon substrate and ITO glass substrate respectively. Alternating current (AC) and direct current (DC) apply on the BPLC cell from 1 volt to 7 volt.

Optical characterization was performed using the cross-polarized and reflection modes of an Olympus BX60 microscope with a 10× and a 50× objective. Kossel diagrams were used to identify the type of blue phase and determine the crystal orientation. FIG. 10 shows images of the resulting cholesteric, BPI, BPII, and isotropic phases. This demonstrates that the single crystal structure can be switched to a different structure or erased by application of electric field.

Polymerization of blue phases to form three-dimensional structures: MLC 2142 and 4-(1-methylheptyloxycarbonyl) phenyl-4-hexyloxybenzoate (S-811) were purchased from Merck. Fisher Finest Premium Grade glass slides and coverslips were obtained from Fisher Scientific. Octadecyltrichlorosilane (OTS), chlorobenzene, isopropyl alcohol and n-amyl acetate were purchased from Sigma-Aldrich and used without further purification.

The 36.3 wt % 4-(1-methylheptyloxycarbonyl)phenyl-4-hexyloxybenzoate (S-811) in MLC 2142 mixtures were prepared by using toluene as a co-solvent. After mixing with an ultrasonic cleaner, toluene was evaporated overnight under vacuum at 60° C.

Blue phase materials (MLC 2124+S811), reactive monomers RM257 (Merck) and TMPTA (Aldrich), and photoinitiator IRG651 (Aldrich) are mixed together with weight percentages as 87.1 wt %, 7.3 wt %, 5 wt % and 0.6 wt %.

A 4-5 nm thick poly(6-(4-methoxy-azobenzene-4'-oxy) hexyl methacrylate) (PMMAZO) film was deposited on an oxygen-plasma cleaned silicon substrate and annealed at 250° C. for 5 min under vacuum. Non-grafted PMMAZO was removed by sonication in chlorobenzene, and the remaining PMMAZO brush was found to be around 4.5 nm thick.

A 40-nm-thick GL2000 photoresist film was deposited onto the PMMAZO brush and baked at 160° C. for 5 min. Stripe pattern, rectangular-array pattern, and circular-array pattern with specific dimension design were exposed on the resists using electron beam lithography (EBL) with the JEOL 9300FS electron-beam writer at the Center for Nanoscale Materials, Argonne National Laboratory. Exposed substrates were developed with n-amyl acetate for 15 s and rinsed with isopropyl alcohol. The resulting resist pattern was transformed onto a chemical pattern on the PMMAZO brush layer by exposing the sample to an oxygen plasma, followed by stripping the GL2000 photoresist in chlorobenzene.

The glass microscope slides were boiled in a piranha solution (7:3 (v/v) of 98% H2SO4/30% H2O2) for 30 min, to remove any stains on the surface, washed with deionized water and dried with nitrogen. The cleaned glass slides were immersed in a mixture of 13.8 mL octadecyltrichlorosilane (OTS) and 120 mL heptane. After 30 min, they were removed from the OTS solution, washed with DCM several times and quickly dried under a nitrogen flow.

The OTS glass and the Si substrate with the PMMAZO chemical patterns were placed face-to-face, with a 3.5 μm spacer, to define the cell thickness. The optical cell and the LC were heated above the clearing point, and the mixture solution prepared in step 3 was injected through capillary action. The system was then slowly cooled down to room temperature.

At this point the sample was ready for the following polymerization process: the BPLC cell was place on the heating stage and gradually increased the temperature to the BPII range (40.4-43.0° C.); after reaching to the BPII range, the hot stage was placed under the UV lamp (365 nm/15 w); the exposure time was 1 hour to 3 hours.

The sample was put into the mixture solvent of 20 wt % dichloromethane and 80 wt % heptane for 10 mins to 50 mins to wash away the BPLCs, with the polymer network structure remaining. SEM was used to image the 3D polymer structure through a Zeiss Merlin FE-SEM with an accelerating voltage of 1 kV and a working distance of 3 mm.

Figure 12:
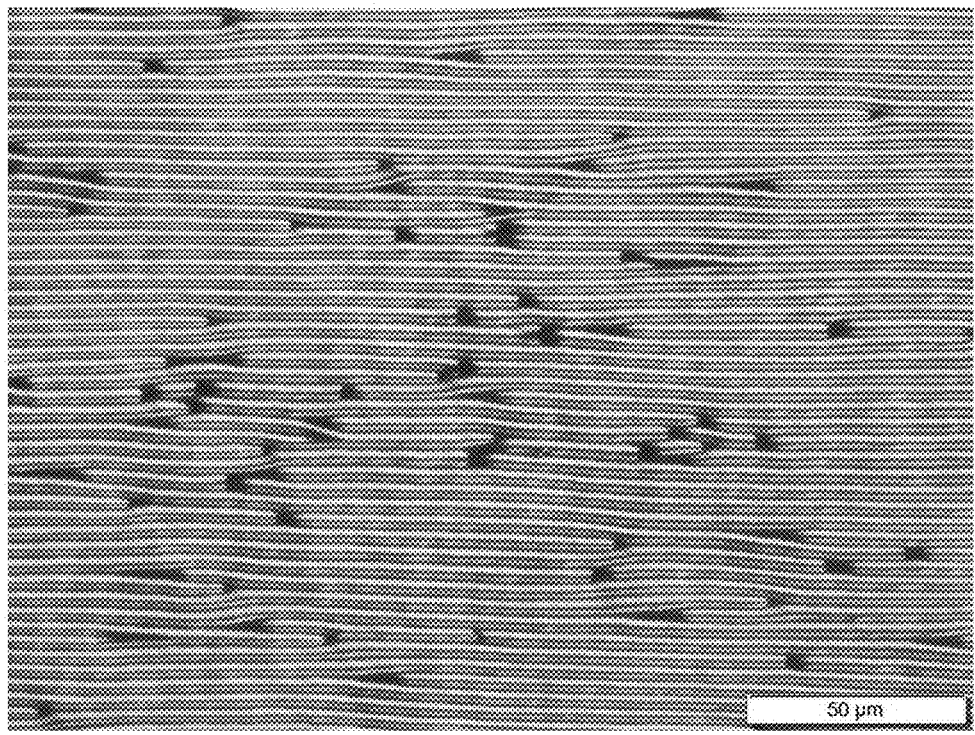
FIG. 12 shows an image of a cholesteric phase directed to assemble on a surface pattern.

Stabilization of the cholesteric phase by chemically patterned surface: As described above, cholesteric liquid crystals are also known as chiral nematic liquid crystals. They organize in layers with no positional ordering within layers, but a director axis that varies with layers. The variation of the director axis tends to be periodic in nature. The period of this variation (the distance over which a full rotation of 360° is completed) is known as the pitch, p. This pitch determines the wavelength of light which is reflected. The BP materials described herein exhibit cholesteric phase when the temperature is below the BP range. The chemical patterns described above produce macroscopic single-crystalline BPI and BPII with cubic lattices where the (100) and the (110) planes are parallel to the (001) plane (substrate), respectively. Chemical patterns can also be used to direct assemble the cholesteric phase. The axis of the helix structure of cholesteric phase aligns perpendicular to the stripe direction of the pattern. Based on the temperature changing within the cholesteric phase range, the pitch of the cholesteric phase will be changed and also the color of such aligned cholesteric stripe will change. FIG. 12 shows an image of the assembled cholesteric phase.

The foregoing describes the instant invention and its certain embodiments. Numerous modifications and variations in the practice of this invention are expected to occur to those skilled in the art. Such modifications and variations are encompassed within the following claims.

What is claimed is:

1. An article comprising:
   a substrate having a surface, wherein the surface is patterned with a surface pattern that extends over a first area;
   a monocrystalline liquid crystalline material that extends over the first area, wherein the surface pattern comprises regions that induce a first orientation of molecules in the monocrystalline liquid crystalline material and regions that a second orientation of molecules in the monocrystalline liquid crystalline material, wherein the first and second orientations are different.

2. The article of claim 1, wherein the monocrystalline liquid crystalline material is a blue phase liquid crystal.

3. The article of claim 1, wherein the monocrystalline material is a cholesteric liquid crystal.

4. The article of claim 1, wherein the surface pattern is a stripe pattern or a hexagonal array pattern.

5. The article of claim 1, wherein the first area is at least 1 mm$^2$.

6. The article of claim 1, wherein the monocrystalline material is at least 20 μm thick.

7. The article of claim 1, wherein the surface pattern relieves elastic distortions that would be induced by a homogenous surface.

8. The article of claim 1, wherein the surface pattern comprises topographical features.

9. The article of claim 1, wherein the surface pattern comprises chemical and topographical features.

10. The article of claim 1, wherein the surface pattern is a pattern of stripes, the pattern period $L_s$ is the width of two adjacent stripes, and the pattern period $L_s$ is equal to the lattice constant of a unit cell of the monocrystalline liquid crystalline material.

11. The article of claim 1, wherein the surface pattern is a hexagonal array of features, the pattern period $L_s$ is the center-to-center distance of adjacent features, and the pattern period $L_s$ is equal to the square root of two times the lattice constant of a unit cell of the monocrystalline liquid crystalline material.

12. The article of claim 1, wherein the surface is patterned with regions that induce a tilted orientation of molecules in the monocrystalline liquid crystalline material.

13. The article of claim 1, wherein the monocrystalline liquid crystalline material is switchable on application of an external field.

14. A liquid crystal cell comprising:
   the article according to claim 1;
   a second substrate having a second substrate surface, wherein the monocrystalline liquid crystalline material is disposed between the surface and the second substrate surface.

15. The liquid crystal cell of claim 14, wherein the second substrate surface is homogenous.

16. The liquid crystal cell of claim 14, wherein the second substrate surface has a second surface pattern.

17. A method comprising:
   providing a first substrate having a surface pattern that extends over a first area;
   providing a second substrate;
   disposing a liquid crystal mixture between the first substrate and the second substrate such that the liquid crystal mixture contacts the surface pattern; and
   allowing the surface pattern to direct the self-assembly of the liquid crystal material to form a monocrystalline liquid crystal over the surface pattern to thereby form an article according to claim 1.

18. An article comprising:
   a substrate having a surface, wherein the surface is patterned with a surface pattern that extends over a first area;
   a monocrystalline liquid crystalline material that extends over the first area, wherein the surface comprises a second surface pattern that extends over a second area and a monocrystalline liquid crystalline material that extends over the second area, wherein the monocrystalline liquid crystalline material that extends over the first area has a first unit cell orientation, the monocrystalline liquid material that extends over the second area has a second unit cell orientation and is separated by the monocrystalline liquid material that extends over the first area by a single defect line.

19. An article comprising:
a substrate having a surface, wherein the surface is patterned with a surface pattern that extends over a first area;
a monocrystalline liquid crystalline material that extends over the first area, wherein the monocrystalline liquid crystalline material overlies a surface that comprises patterned regions separated by an unpatterned region.

* * * * *